(12) United States Patent
Watanabe et al.

(10) Patent No.: US 9,100,619 B2
(45) Date of Patent: Aug. 4, 2015

(54) VIDEO SYNTHESIZING APPARATUS AND PROGRAM

(75) Inventors: Shuichi Watanabe, Chiba (JP); Jiro Kiyama, Chiba (JP); Takayoshi Yamaguchi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 569 days.

(21) Appl. No.: 12/661,899

(22) Filed: Mar. 25, 2010

(65) Prior Publication Data
US 2010/0260478 A1    Oct. 14, 2010

Related U.S. Application Data

(63) Continuation of application No. 11/989,212, filed as application No. PCT/JP2006/314264 on Jul. 19, 2006, now Pat. No. 8,687,121.

(30) Foreign Application Priority Data

Jul. 27, 2005    (JP) ................................. 2005-218064

(51) Int. Cl.
*H04N 9/80*    (2006.01)
*H04N 5/45*    (2011.01)
(Continued)

(52) U.S. Cl.
CPC ............. *H04N 5/45* (2013.01); *H04N 21/4307* (2013.01); *H04N 21/4316* (2013.01); *H04N 21/84* (2013.01)

(58) Field of Classification Search
USPC ................................................. 386/241, 230
See application file for complete search history.

(56) References Cited

U.S. PATENT DOCUMENTS 5,574,507 A    11/1996    Baek
(Continued)

FOREIGN PATENT DOCUMENTS

EP    1304876 A2    4/2003
(Continued)

OTHER PUBLICATIONS

"WC2 synchronized multimedia integration language (SMIL) 1.0 specification" Internet Citation, Jun. 15, 1998, pp. 1-38, retrieved from the internet URL:httl://www.w3.org/TR/REC-smil/>.
(Continued)

*Primary Examiner* — Thai Tran
*Assistant Examiner* — Jose Mesa
(74) *Attorney, Agent, or Firm* — Mintz Levin Cohn Ferris Glovsky and Popeo, P.C.; David G. Conlin; Jonathan P. Western

(57) ABSTRACT

The invention provides data for display on the display area for a child frame when the child frame is synthesized and displayed on the parent frame in picture-in-picture playback in order to give the displayed area of the child frame in conformity with the video content in the parent frame, as well as providing a video display apparatus etc. for displaying the child frame at an appropriate displayed position using the data for display. A video display apparatus 1 includes: decoders 101 and 103 for decoding two sets of video data; a synthesizer 105 for synthesizing the decoded videos to output; an input unit 108 for commanding display/non-display of the child frame; a processing controller 109 for controlling the operations of decoders 101 and 103 in accordance with the command; and a position designator 110 which receives the command and the data for display and time information and designates the displayed position of the child frame to the synthesizer 105. The position designator 110 determines the displayed position of the child-frame video in accordance with displayable time information of the child-frame video and information on the displayed area or displayable area depending on time, included in the data for display.

8 Claims, 17 Drawing Sheets

(51) Int. Cl.
*H04N 21/43* (2011.01)
*H04N 21/431* (2011.01)
*H04N 21/84* (2011.01)

(56) References Cited

U.S. PATENT DOCUMENTS

| | | | |
|---|---|---|---|
| 5,574,564 A | 11/1996 | Timmermans | |
| 5,852,474 A * | 12/1998 | Nakagaki et al. | 348/564 |
| 7,206,029 B2 * | 4/2007 | Cohen-Solal | 348/565 |
| 7,877,766 B1 | 1/2011 | Wu et al. | |
| 2002/0059648 A1 | 5/2002 | Ohba et al. | |
| 2002/0140681 A1 | 10/2002 | Ichikawa | |
| 2004/0061805 A1 * | 4/2004 | Shibamiya et al. | 348/565 |
| 2004/0098753 A1 | 5/2004 | Reynolds et al. | |
| 2004/0150748 A1 | 8/2004 | Phillips et al. | |
| 2005/0008329 A1 * | 1/2005 | Suzuki et al. | 386/52 |
| 2007/0003221 A1 | 1/2007 | Hamada et al. | |

FOREIGN PATENT DOCUMENTS

| | | |
|---|---|---|
| EP | 1679 885 A1 | 7/2006 |
| JP | 7-181954 | 7/1995 |
| JP | 7-287646 | 10/1995 |
| JP | 10-134030 | 5/1998 |
| JP | 2001-312737 | 11/2001 |
| JP | 2002-247475 | 8/2002 |
| JP | 2004-78414 | 3/2004 |
| JP | 2004-140813 | 5/2004 |
| JP | 2005-123775 | 5/2005 |
| JP | 2005-130083 | 5/2005 |
| WO | WO-02/49351 A2 | 6/2002 |
| WO | WO-2004/030351 A1 | 4/2004 |
| WO | WO-2005 015899 A1 | 2/2005 |

OTHER PUBLICATIONS

"WC3 synchronized multimedia integration language (SMIL) 1.0 specification" Internet Citation, Jun. 15, 1998, pp. 1-38, XP002957990, retrieved from the internet URL:httl://www.w3.org/TR/REC-smil/>.

Stone, Ken: "The Baxics—Picture in Picture, Animation, and Split Screen", , May 9, 2001 XP-002597533.

Stone, Ken: "The Basics—Picture in Picture, Animation, and Split Screen", May 9, 2001 XP-002597533; URL: http://www.kenstone.net/fcp_homepage/basic_pip.html.

* cited by examiner

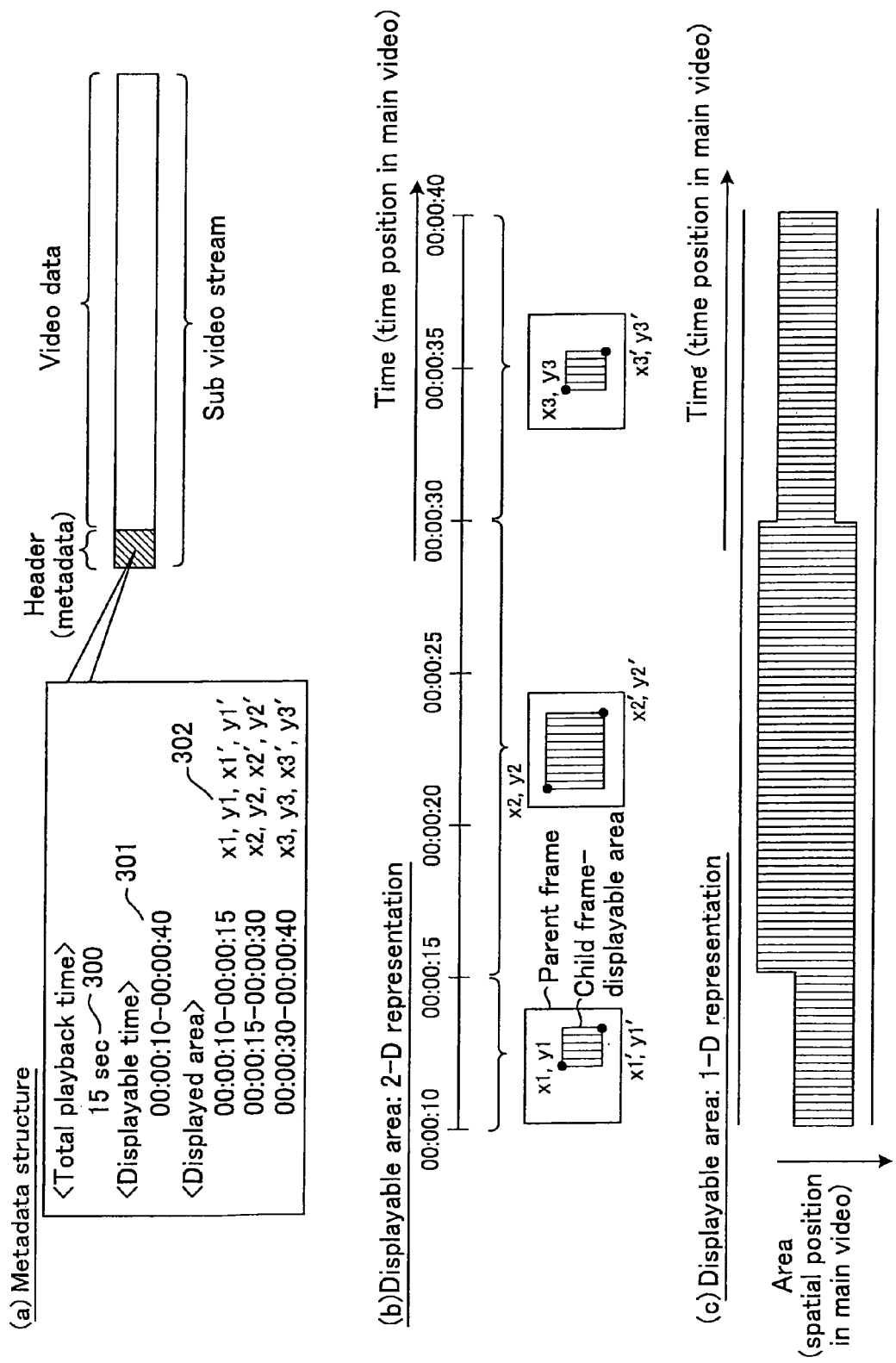

FIG.4

| | | Time designation | |
|---|---|---|---|
| | | Arbitrary section ([ ] can be omitted) | Unit section (unit: 5 sec.) |
| Area designation | Only one set of coordinates (with a fixed display size) | 00:00:10 [- 00:00:15]  x1, y1<br>00:00:15 [- 00:00:30]  x2, y2<br>00:00:30 [- 00:00:40]  x3, y3 | x1, y1<br>x2, y2<br>x2, y2<br>x2, y2<br>x3, y3<br>x3, y3 |
| | Two sets of coordinates | 00:00:10 [- 00:00:15]  x1, y1, x1', y1'<br>00:00:15 [- 00:00:30]  x2, y2, x2', y2'<br>00:00:30 [- 00:00:40]  x3, y3, x3', y3' | x1, y1, x1', y1'<br>x2, y2, x2', y2'<br>x2, y2, x2', y2'<br>x2, y2, x2', y2'<br>x3, y3, x3', y3'<br>x3, y3, x3', y3' |
| | One set of coordinates + size (w:width, h:hight) | 00:00:10 [- 00:00:15]  x1, y1, w1, h1<br>00:00:15 [- 00:00:30]  x2, y2, w2, h2<br>00:00:30 [- 00:00:40]  x3, y3, w3, h3 | x1, y1, w1, h1<br>x2, y2, w2, h2<br>x2, y2, w2, h2<br>x2, y2, w2, h2<br>x3, y3, w3, h3<br>x3, y3, w3, h3 |

VIDEO SYNTHESIZING APPARATUS AND PROGRAM

CROSS-REFERENCE TO RELATED APPLICATIONS

This application is a continuation application of U.S. Ser. No. 11/989,212 filed Jan. 22, 2008, which is the national stage of International Application PCT/JP2006/314264 filed Jul. 19, 2006, which in turn claims priority from Japanese Application No. 2005-218064 filed Jul. 27, 2005, the disclosures of which are herein incorporated by reference.

TECHNICAL FIELD

The present invention relates to a video synthesizing apparatus and program which, when first and second videos are input, displays a synthesized video by combining the second video with the first video.

BACKGROUND ART

With the development of high-speed network infrastructure and with the development of large capacity recording media, the absolute quantity of video data that can be handled at a time by the user or by user video equipment has markedly increased. With this trend, various functions that are achieved using a plurality of sets of video data and high-performance applications based on such functions have been emerging. As one of such functions, there is a function called "picture in picture".

"Picture in picture" is a function for displaying two videos at the same time by superimposing a small child frame over the screen (parent frame). This function is used for, for example "multi-angle representation" for displaying, in the child frame, a video taken from a different angle of view from that of the video for the parent frame or for "commentary display" for displaying additional information in a commentary style as to the video of the parent frame (for example, displaying in the child frame a director's commentary video or the like recorded with untold stories during shooting the movie).

Picture in picture is realized for example by decoding two sets of video data over two different layers and superimposing these decoded videos, as shown in FIG. 17. In this case, the video for the child frame is adjusted in its display size and displayed position in order to be laid over the parent frame. Also, the child frame at the time of picture in picture may have a video of an arbitrary shape, other than the rectangular video shown in FIG. 17. The picture-in-picture function and the method of realizing it are described in for example patent document 1.

Patent document 1:
  Japanese Patent Application Laid-open 2005-123775

DISCLOSURE OF INVENTION

Problems to be Solved by the Invention

In the conventional picture in picture, the displayed position of the child frame would have been determined beforehand, and the child frame was displayed at that position.

In picture in picture, the video in the child frame is overlapped and displayed over the video in the parent frame, therefore, part of the parent frame video will be hidden by the child-frame video when the child frame is displayed. For this reason, it is preferred that the displayed position of the child frame in the parent frame can be switched in accordance with the changing content of the parent frame video.

Further, as one application of using picture in picture, there is a possible configuration in which the child-frame video is given so as to be able to be started to play, paused and restarted, freely at arbitrary points of time within a particular period. The child frame is displayed only when the video is playing. This configuration is utilized when, for example, the child-frame video is one that is added as a privilege video to the parent-frame video and hence it is not necessary for the child-frame video to be exactly synchronized with the parent frame but the child-frame video (privilege video) should be permitted to be played for a particular duration alone in the parent-frame video. Also in this case, it is preferred that the displayed position in which the child frame should be displayed on the parent frame is appropriately given in accordance with the content of the parent-frame video every time the child frame is displayed.

However, despite such demand there has been no conventional method for giving a changeable displayed position for the child frame in accordance with the change of the parent-frame video as described above. It has been hence impossible to make the above-described application feasible.

The present invention has been devised in view of the above problem, it therefore an object to provide data for display that specifies the displayable period, the area to be displayed or displayable area at every moment, as to the displayed position of the child frame during picture-in-picture playback. It is also an object to provide a video synthesizing apparatus and program, which, based on the data for display, can provide the appropriate displayed position of the child frame even when the playback time and stopped time of the child-frame video are freely changed as described above.

Means for Solving the Problems

In order to solve the above problem, the first invention is a video synthesizing apparatus which receives a first video and a second video and outputs the first video synthesized with the second video, comprising: a designating means which receives data for display including: time information representing time in the first video at which the second video can be displayed; and displayed area information representing a displayed area of the second video, imparted in correspondence with the time, and designates a displayed position inside the first video when the second video is displayed based on the data for display; and a synthesizing means for laying and synthesizing the second video over the displayed position inside the first video, designated by the designating means.

The second invention is the video synthesizing apparatus of the first invention and is characterized in that the data for display includes second displayed area information that represents a displayed area of the second video, imparted in correspondence with time in the second video, and the designating means, when displaying the second video, performs a process of designating the displayed position in accordance with the displayed area information and/or the second displayed area information included in the data for display.

The third invention is the video synthesizing apparatus of the first invention and is characterized in that the data for display includes displayable area information that represents a displayable area of the second video, imparted in correspondence with time in the second video, and the designating means, when displaying the second video, performs a process of designating the displayed position in accordance with the displayed area information and/or the displayable area information included in the data for display.

The fourth invention is a video synthesizing apparatus which receives a first video and a second video and outputs the first video synthesized with the second video comprising: a designating means which receives data for display including: time information representing time in the first video at which the second video can be displayed; and displayable area information representing a displayable area of the second video, imparted in correspondence with the time, and designates a displayed position inside the first video when the second video is displayed based on the data for display; and a synthesizing means for laying and synthesizing the second video over the displayed position inside the first video, designated by the designating means.

The fifth invention is video synthesizing apparatus of the fourth invention and is characterized in that the data for display includes displayed area information that represents a displayed area of the second video, imparted in correspondence with time in the second video, and the designating means, when displaying the second video, performs a process of designating the displayed position in accordance with the displayable area information and/or the displayed area information included in the data for display.

The sixth invention is the video synthesizing apparatus of the fourth invention and is characterized in that the data for display includes second displayable area information that represents a displayable area of the second video, imparted in correspondence with time in the second video, and the designating means, when displaying the second video, performs a process of designating the displayed position in accordance with the displayable area information and/or the second displayable area information included in the data for display.

The seventh invention is a video synthesizing apparatus which receives a first video and a second video and outputs the first video synthesized with the second video, comprising: a designating means which receives data for display including: time information representing time in the second video differing from time in the first video and displayed area information representing a displayed area of the second video, imparted in correspondence with the time in the second video, and designates a displayed position inside the first video when the second video is displayed based on the data for display; and a synthesizing means for laying and synthesizing the second video over the displayed position inside the first video, designated by the designating means.

The eighth invention is a video synthesizing apparatus which receives a first video and a second video and outputs the first video synthesized with the second video, comprising: a designating means which receives data for display including: time information representing time in the second video differing from time in the first video and displayable area information representing a displayable area of the second video, imparted in correspondence with the time in the second video, and designates a displayed position inside the first video so that the second video is included in the displayable area information when the second video is displayed based on the data for display; and a synthesizing means for laying and synthesizing the second video over the displayed position inside the first video, designated by the designating means.

The ninth invention is the video synthesizing apparatus of anyone of the first to eighth inventions and is characterized in that the synthesized output video is a video in a picture-in-picture format, and the first video corresponds to the video to be displayed on a parent frame and the second video corresponds to the video to be displayed on a child frame.

The tenth invention is characterized by enabling a computer receiving a first video and a second video and performing control of outputting the first video synthesized with the second video, to realize a designating function of performing control which, by receiving data for display including time information representing time in the first video at which the second video can be displayed and displayed area information representing a displayed area of the second video, imparted in correspondence with the time, designates a displayed position inside the first video when the second video is displayed based on the data for display; and a synthesizing function of performing control of laying and synthesizing the second video over the displayed position inside the first video, designated by the designating function.

The eleventh invention is the video synthesizing apparatus of the first or seventh invention and is characterized in the displayed area information includes a set of coordinates of an upper left vertex of a rectangular area for displaying the second video.

The twelfth invention is the video synthesizing apparatus of the fourth or eighth invention and is characterized in that the displayable area information includes a set of coordinates of an upper left vertex of a rectangular area in which the second video can be displayed.

Advantage of the Invention

The invention provides data for display on the displayed position of a child frame during picture-in-picture playback, giving displayable time and the displayed area or displayable area. This data for display either may be included in the video data of the child-frame video or parent-frame video, or may be stored in management data that is independent of the video data and handled with the video data during video transmission or distribution. In the video displaying apparatus and method, the data for display is used to determine the displayed position of the child frame in correspondence with the playback time of the parent (child)-frame video every time it is readout. These configurations, when a child-frame video is synthesized for its display on the parent-frame video in picture in picture, enable the child-frame video to be displayed for playback by displaying it in the suitable displayed position. As a result, the child-frame video can be switched freely between display and non-display within the range of the displayable time. Further, every time the child-frame video is switched freely between display and non-display, the child-frame video can be synthesized for its display at an appropriate position. Accordingly, it is possible to perform playback during picture-in-picture in the way the distributor intended.

BRIEF DESCRIPTION OF DRAWINGS

FIG. 3 is a diagram showing another example of data for display used in the video display apparatus according to the first embodiment of the present invention.

FIG. 4 is a diagram showing a variation of data for display used in the video display apparatus according to the first embodiment of the present invention.

Figure 1:
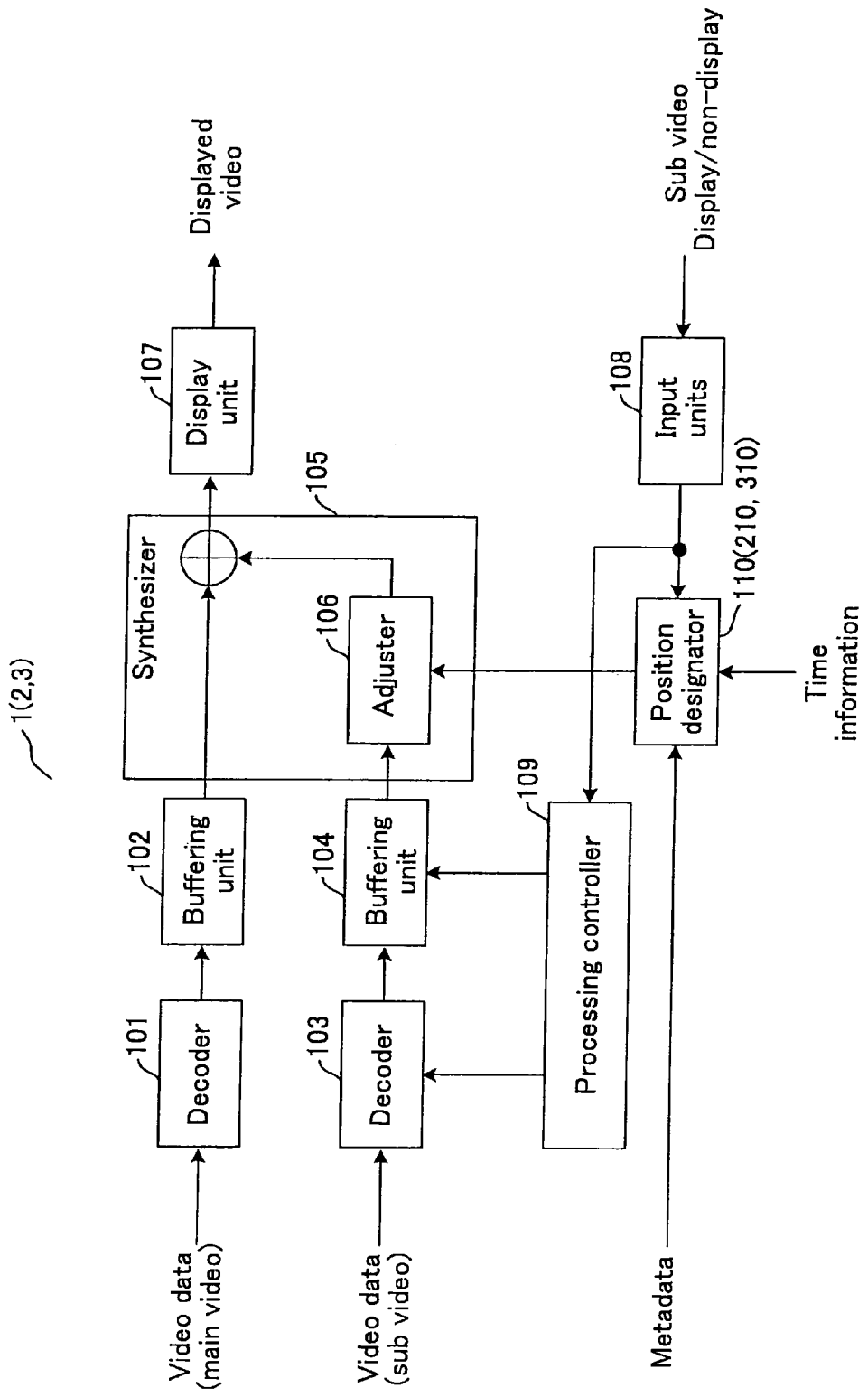
FIG. 1 is a functional block diagram showing a schematic configuration of a video display apparatus according to the first, second and third embodiments of the present invention.

DESCRIPTION OF REFERENCE NUMERALS 1, 2, 3, video display apparatuses
101, 103 decoders
102, 104 buffering units
105 synthesizer
106 adjuster
107 display unit
108 input unit
109 processing controller
110, 210, 310 position designator

BEST MODE FOR CARRYING OUT THE INVENTION

Next, referring to the drawings a video synthesizing apparatus according to the present invention will described in detail when it is applied to a video display apparatus that displays a synthesized video.

The First Embodiment

The video display apparatus, method and data for display according to the first embodiment of the present invention will be described with reference to FIGS. 1 to 10.

FIG. 1 is the functional block diagram showing a schematic configuration of a video display apparatus 1 according to the first embodiment of the present invention. Video display apparatus 1 receives two sets of video data (encoded video streams), decodes and combines these to display in a so-called "picture-in-picture representation" state. In this specification hereinbelow, the video displayed in the parent frame and the video displayed in the child frame in the picture-in-picture representation will be called "main video" and "sub video", respectively, in distinction from each other.

Video display apparatus 1 includes: a decoder 101 and buffering unit 102 for decoding the video data of main video and controlling the output thereof; a decoder 103 and buffering unit 104 for decoding the video data of sub video and controlling the output thereof; a synthesizer 105 with an adjuster 106 incorporated therein for combining the sub video with the main video; and a display unit 107 for displaying the output video. In addition, the apparatus further includes: an input unit 108 for receiving a user's switching instruction for display/non-display of the sub video (child frame); a process controller 109 for controlling the processing of decoder 103 and/or buffering unit 104 in accordance with the switching; and a position designator 110 for designating the displayed position of the sub video (child frame) from the data for display and time information during playback as to the sub video, which are separately input. In this specification, this data for display to be used for designating the displayed position of the sub video (child frame) is called "metadata" in contrast to video data.

Here, video display apparatus 1 was described to include decoders 101 and 103, but this is not essential. For example, if the input video data is video data that has not been encoded, video display apparatus 1 does not need to include decoders 101 and 103. Also, video display apparatus 1 in FIG. 1 is constructed of functional blocks regarding the processing of video data (data having to do with video signals) only. However, practical video data includes, other the data involving video signals, audio data and management data (information necessary for decoding encoded data such as encoding system etc., and information necessary for playing video, such as a play list for designating video clipping and joining, and the like), and the actual video display apparatus is constructed further including the functional blocks for processing these. In this case, the configuration in FIG. 1 is installed as an internal structure of the actual video display apparatus.

To begin with, description will be made of the processing in video display apparatus 1 when no sub video (child frame) is displayed. In this occasion, no video data of sub video is input or though it is input, the video data is subjected to a non-display process.

The input video data of main video is decoded by decoder 101, and the decoded video is adjusted as to timing by buffering unit 102 and output. Since no sub video is displayed, the decoded video output from buffering unit 102 passes through synthesizer 105 without being processed therein and is supplied to display unit 107. So, the main video is displayed as it is.

Next, description will be made of the processing in video display apparatus 1 when a sub video (child frame) is displayed.

The video data of the input sub video is decoded at decoder 103, and the decoded video is adjusted as to timing by buffering unit 104 and output. This decoded picture of sub video is input to adjuster 106 inside synthesizer 105.

Adjuster 106, as a pre-process for synthesizing the sub video with the main video, converts and adjusts the image size, and the displayed position on the screen, of the decoded picture of the sub video. On this occasion, the sub video (child frame) is adjusted so as to be synthesized in the displayed position that is designated by position designator 110 described later, within the main video (parent frame). There-after, the sub video after the adjustment is synthesized with the decoded picture of the input main video, so that the synthesized video is output and displayed through display unit 107. Further, it is also possible to make the main video be seen through the synthesized sub video by setting a transmittance when they are synthesized.

Video display apparatus 1 includes input unit 108, which receives a switching instruction for display/non-display of the sub video (child frame) from the user. Then, input unit 108, based on the input switching instruction, generates a display status information that indicates whether the sub video (child frame) should be displayed or non-displayed at the current point of time and transfers it to processing controller 109 and position designator 110.

Processing controller 109 receives the display status information from input unit 108 and controls the processing of decoder 103 and/or buffering unit 104 based on it. For example, when the display status information has come to "non-displayed state", the controller stops the decoding process at decoder 103 and/or output from buffering unit 104 and restarts these processes when the display status information comes to "displayed state", to thereby pause the sub video during the non-displaying period.

Position designator 110 receives the display status information from input unit 108, and when the sub video (child frame) is in the displayed state, it determines the displayed position of the sub video (child frame) to be displayed in the main video (parent frame) using the after mentioned metadata and notifies adjuster 106 of the result.

As the main video is changing temporally, the displayed position in the main video, at which the sub video is wanted to be displayed or may be displayed changes temporally with the change of the main video. Accordingly, if playback and display of the sub video is restarted some time after the sub video was stopped in its display and set into pause, by processing controller 109 and decoder 103 and/or buffering unit 104 that are controlled by processing controller 109 as stated above, it is not always desirable that the sub video is displayed at the same position as before when it was stopped in its display. The data for display for sub video given in the present invention, namely metadata is the data which is given with information on where the sub video should or can be displayed in the main video with every time position in the main video. Position designator 110, using the metadata that is input with the video data of the sub video, outputs the displayed position of the sub video (child frame) corresponding to the time position indicated by the time information during playback.

Referring to FIGS. 2 to 5, the metadata for video display, handled in the present embodiment will be described in further detail.

Figure 2:
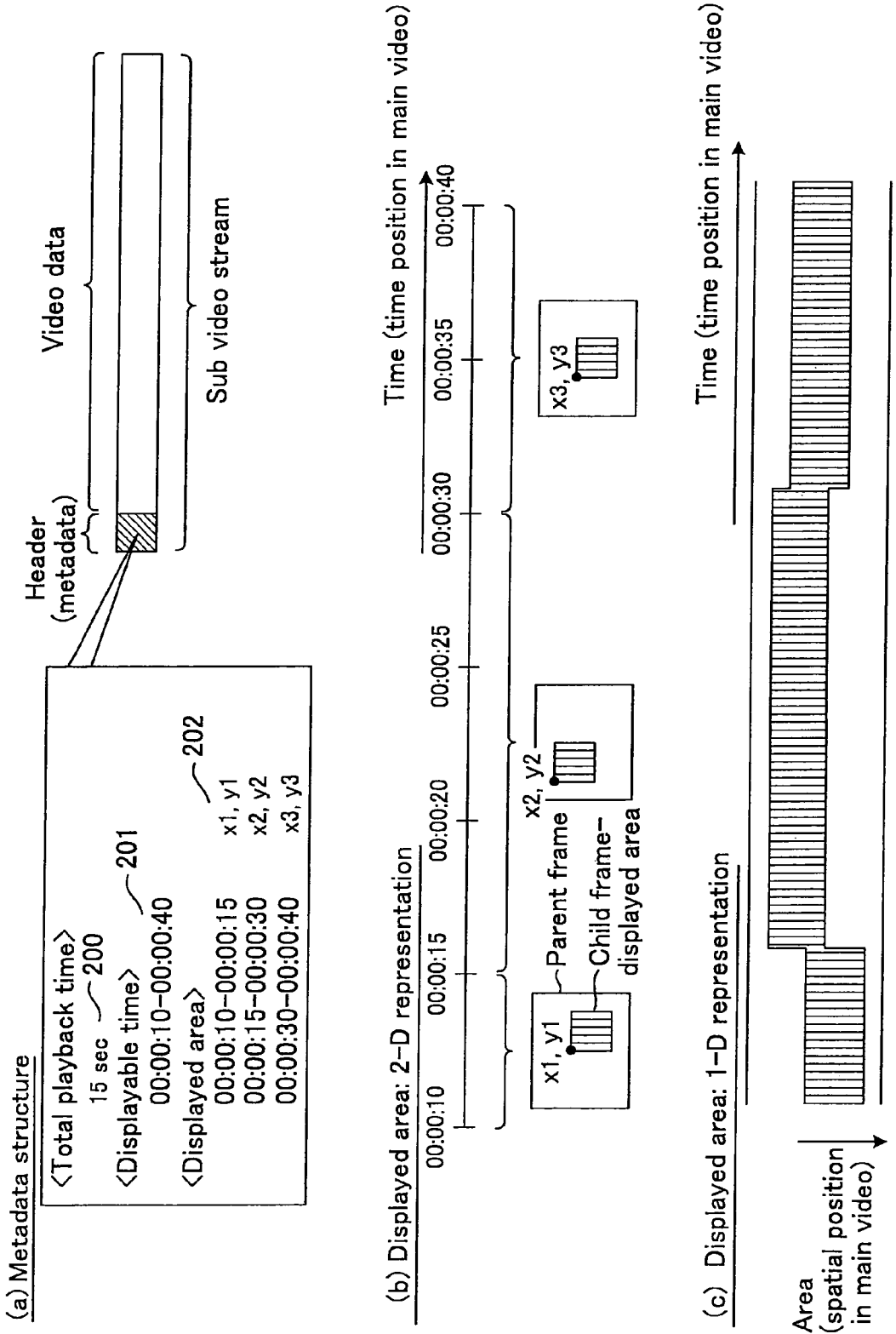
FIG. 2 is a diagram showing an example of data for display used in the video display apparatus according to the first embodiment of the present invention.

FIGS. 2 and 3 show specific examples of metadata according to the sub video display given in the present invention. The video stream (sub video stream) contained in the video data is composed of a header portion and a video data portion. The header portion includes various kinds of information regarding the stream, and this header portion includes the metadata.

FIGS. 2 and 3 each show a specific structure of metadata (FIG. 2(a), FIG. 3(a)) and a diagram showing the displayed area or displayable area, designated by the metadata (FIG. 2(b), FIG. 3(b)). Also, a diagram (FIG. 2(c), FIG. 3(c)) schematically showing the displayed area or displayable area in one dimension is added in order to allow an easy understanding of the temporal variation of the displayed area or displayable area. That is, the vertical axis in FIGS. 2(c) and 3(c) represents spatial two-dimensional position on the screen and the vertical width of the illustrated band corresponds to the size of the displayed area or displayable area.

FIG. 2(a) shows an example of a metadata structure. The metadata is comprised of: total play time 200 of a sub video; displayable time information 201 that represents the time range of the main video that allows the sub video to be displayed, based on the playback time in the main video (the playback time based on "00:00:00", the playback starting position); and displayed area information 202 that shows the position in the main video in which the sub video is displayed at each moment in the displayable time range. Here, displayed area information 202 in FIG. 2 gives the upper left vertex of the child frame on the assumption that the sub video (child frame) has a predetermined fixed display size. For example, the sub video is displayed from time "00:00:10" with its upper left vertex positioned at (x1, y1). It should, of course, be understood that the coordinates of the vertex are not limited to the coordinates of the upper left point, but the coordinates of the center of the sub video, for example can be used.

FIG. 2(b) shows a two-dimensional representation of the displayed area where the sub video is displayed at individual points of time of the main video. For example, from time "00:00:15" to time "00:00:30", the sub video is synthesized and displayed in the area in the main video with its upper left vertex set at coordinates (x2, y2).

FIG. 2(c) shows a one-dimensional representation of the displayed area where the sub video is displayed. The vertical direction shows the spatial position (area) in the main video and the horizontal direction shows time (time position of the main video). For example, the upper left vertex of the sub video shifts from coordinates (x1, y1) to (x2, y2) at the time of "00:00:15". In FIG. 2(c), the displayed area of the sub video in the main video is given by a band region that changes its position at times "00:00:15" and "00:00:30".

FIG. 3(a) also shows an example of a metadata structure. The metadata shown in FIG. 3(a) is comprised of: total play time 300 of a sub video; displayable time information 301 that represents the time range of the main video that allows the sub video to be displayed, based on the playback time in the main video; and displayable area information 302 that shows the area in the main video in which the sub video can be displayed (display is permitted) at each moment in the displayable time range. Here, displayable area information 302 shown in FIG. 3 gives coordinates of two points, upper left and lower right vertexes for the area in which the child frame can be displayed. For example, referring to FIG. 3(b), it is shown that from time "00:00:10" the sub video (child frame) can be displayed in a rectangular area having an upper left vertex at coordinates (x1, y1) and a lower right vertex at coordinates (x1', y1'). If the sub video (child frame) has a predetermined fixed display size and when the displayable area designated by displayable area information 302 in FIG. 3 is greater than the display size of the child frame, the sub video will be able to be displayed at an arbitrary position within the displayable area when it is displayed. Further, the sub video (child frame) being displayed may be moved or enlarged within the range of the displayable area. For example, in FIG. 3(c), the area in which the sub video can be displayed in the main video is specified by a band region that changes its position and widths at times "00:00:15" and "00:00:30".

Though in the two examples shown in FIGS. 2 and 3, the displayed (displayable) area specified by the metadata was described on the assumption that the sub video (child frame) has a fixed size, the sub video size is not limited to this; the displayed area information is adapted to give the sub video's display size itself. That is, similarly to FIG. 3 the displayed area is specified by the coordinates of two points, upper left and lower right vertexes, and the sub video may be displayed so that the sub video is enlarged or reduced to meet the size of the displayed area.

A table in FIG. 4 shows variations for setting up the time ranges in which the displayed (displayable) area is specified and of the descriptive format of the displayed (displayable) area, with regard to the metadata given by the present invention. Here, FIG. 4 shows the cases where the displayed (displayable) areas are limited to rectangular shapes.

There are different ways of setting up the time ranges; one way is to specify arbitrary sections and another way is to give a display (displayable) area to every section of a fixed unit. Here, when arbitrary sections are specified, if it is assumed that there is no time gap or overlap within a continuous duration, one of the starting and ending times of a section may be omitted. Further, in the table of FIG. 4, a generally used time notation, "hour:minute:second" is used as an example. However, the time notation is not limited this; for example, the total time can be given in a "second" or "millisecond" format. On the other hand, when a displayed (displayable) area is given to every section of a fixed unit, one displayed (displayable) area is given to every unit of an arbitrary time, for example, every second, every 250 milliseconds, every minute or the like, other than every five seconds which is exemplified in FIG. 4. Further, it is also possible to use a unit during video encoding other than time such as a frame unit and a GOP (Group Of Picture) unit. The length of a unit section is set appropriately depending on the properties of the stored video.

The descriptive formats of the displayed (displayable) area may be specified in several ways, including a single set of coordinates, two sets of coordinates, and a set of coordinates with a size. Of these, the case where the area can be determined with a single set of coordinates is one where the display size of the sub video has been previously determined. When the area is specified with two sets of coordinates or a set of coordinates with a given size, there are two possible cases where the display size of the sub video is smaller than the specified area or a so-called displayable area is specified, and where the sub video is resized (enlarged or reduced in size) into the specified area or the displayed area. As a displayable area it is also possible to designate a band-like area ranging from top to bottom or from left to right in the main video (e.g., an area ranging the upper half or lower half of the screen). Though in FIG. 4 the examples of the displayed (displayable) area are specified as rectangular areas, other than this, the displayed (displayable) area may be given as a shape other than a rectangle, such as a polygon and oval, or may be formed in an arbitrary shape. An area of an arbitrary shape can be formed for example by using a masking image of the shape. Here, description of a specific descriptive format for an arbitrary shape is omitted.

Figure 5:
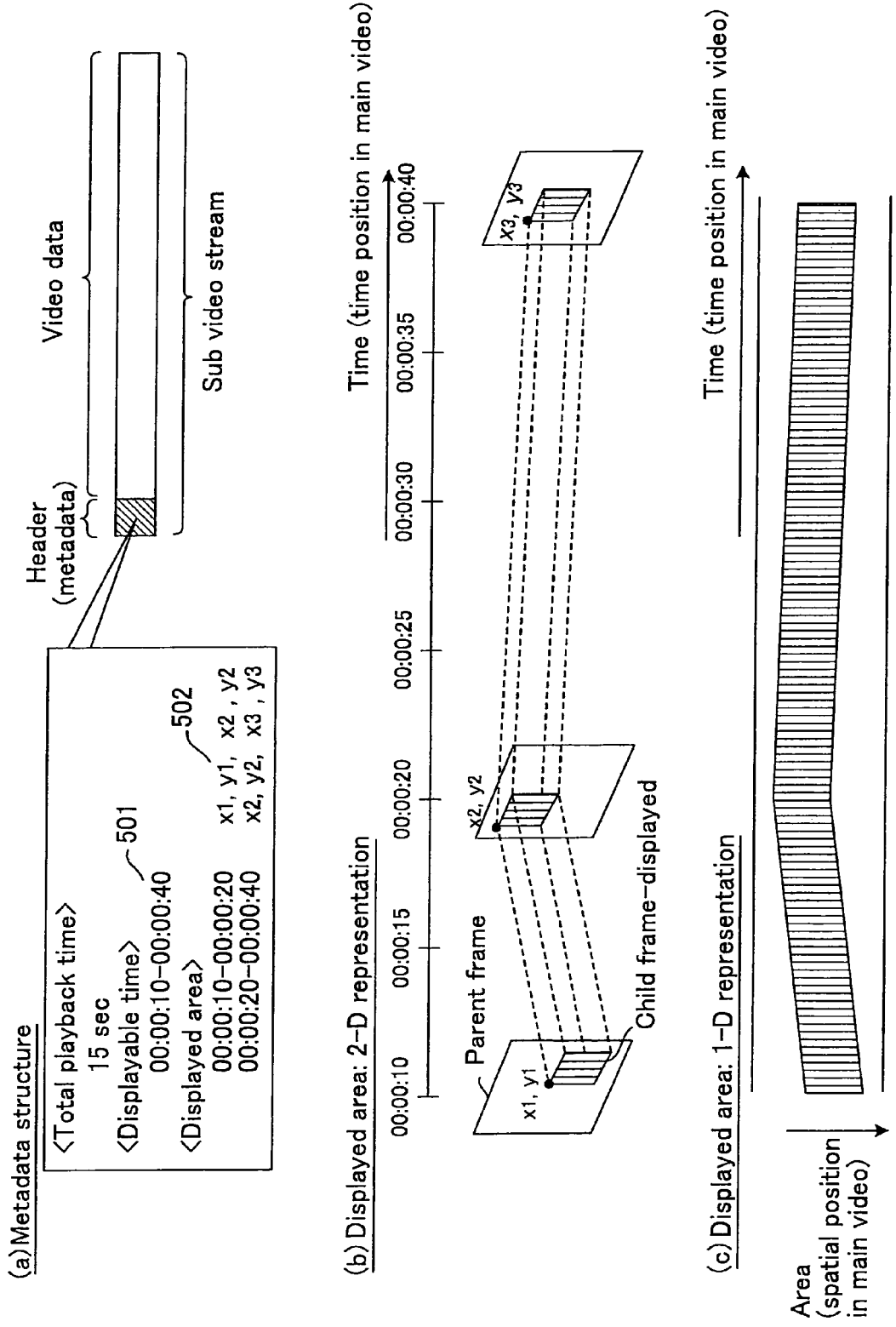
FIG. 5 is a diagram showing still another example of data for display used in the video display apparatus according to the first embodiment of the present invention.

Further, it is also possible to specify a displayed (displayable) area that moves continuously with time as shown in FIG. 5 instead of the cases shown in FIGS. 2 and 3 in which the position of the displayed (displayable) area changes discretely at certain points of time. In this case, a displayed (displayable) area information 502 included in the metadata (FIG. 5(a)) can be given, for example by a combination of a time section, a position of the displayed (displayable) area at the starting time position of the time section, and a position of the displayed (displayable) area at the ending time position of the time section, as shown in FIG. 5. As an example, FIG. 5(b) shows a displayed area of a child frame. Here, at time "00:00:10", a child frame is displayed in a displayed area having its upper left point at coordinates (x1, y1). Then the displayed area is continuously shifted so that the child frame is displayed at time "00:00:20" in the displayed area having its upper left point at (x2, y2). Further, the displayed area is continuously shifted so that the child frame is displayed at time "00:00:40" in the displayed area having its upper left point at (x3, y3). FIG. 5(c) shows the above case in a schematic manner, where the displayed area or displayable area is represented in one dimension.

It should be noted that the method for specifying an area that continuously changes is not limited to this. It is also possible to specify a displayed (displayable) area by giving its position at the starting time position together with a unit variation (movement vector).

Further, in the present invention an area specified by the metadata is handled as a displayed area (an area in which display is made) or displayable area (an area in which display is permitted). On the contrary, this can be also understood as that areas other than the above are specified as the display prohibited areas (areas in which display is not permitted). That is, the present invention can be similarly applied to the metadata that specifies displayable time and display prohibited areas.

Referring next to FIGS. 6 to 10, description will be made of the specific operation when the sub video which is synthesized with the main video is played back and displayed using the metadata for display described heretofore.

Figure 6:
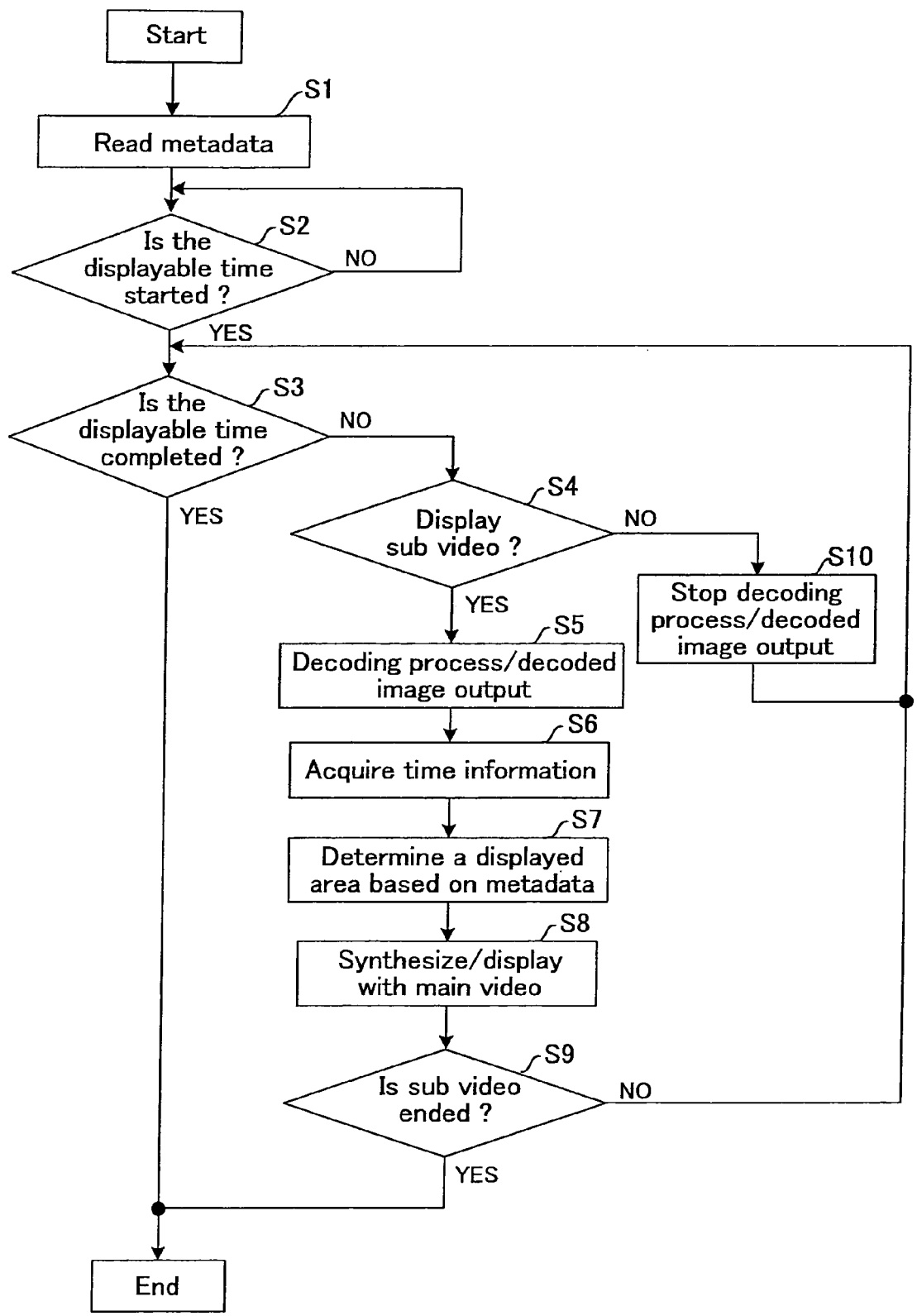
FIG. 6 is a flow chart showing the processing when a video is displayed on the video display apparatus according to the first, second or third embodiment of the present invention.

FIG. 6 is a flow chart showing a process when a sub video is displayed, including the switching of display/non-display of the sub video (child frame). This flow chart mainly shows the operations of position designator 110, processing controller 109 and synthesizer 105 of the apparatus components of video display apparatus 1 shown in FIG. 1. FIGS. 7 to 10 show an example of an operation result when a sub video is synthesized and displayed on video display apparatus 1 of FIG. 1, in accordance with the flow chart of FIG. 6. In FIGS. 7 to 10, a solid black portion indicates the time during which the sub video is displayed and the displayed position at that time.

In the description hereinbelow, playback and display processing will be described taking an example of the metadata shown in FIG. 2, in which the size of the displayed area is equal to the display size of the sub video. However, even though use is made of metadata that describes a so-called displayable area, namely a case that the size of the displayed area is hence greater than the display size of the sub video, the basic operation is unchanged except in that an appropriate displayed position is selected from the displayable area by designator 110 and output.

Position designator 110 reads metadata (Step S1), then determines whether the current playback time of the main video falls within the displayable time based on the displayable time information (201 in FIG. 2) included in the metadata (Steps S2 and S3). If it is before the starting time of the displayable time, no sub video is displayed and the start of the displayable time is waited for (Step S2; No).

If the current playback time in the main video is within the displayable time (Step S2; Yes→Step S3; No), position designator 110 takes up a switching instruction between sub video displayed and non-displayed statuses from input unit 108. Here, when the instruction for displaying the sub video is received so that the sub video is in the displayed status (Step S4; Yes), a decoding process of the sub video is implemented so as to output a decoded picture (Step S5). Further, position designator 110 acquires the time information regarding the current playback time position in the main video (Step S6) and determines the displayed position of the sub video corresponding to the current playback time position, based on the metadata (Step S7). Then, synthesizer 105 synthesizes and displays the sub video at the displayed position designated in the main video (Step S8). When the data of the sub video is not completed (Step S9; No), the operation goes to Step S3 for continuation of the process.

On the other hand, when the sub video is instructed to set into the non-displayed status by the user using the switching instruction between sub-video displayed and non-displayed statuses (S4; No), decoding and output processing of the sub video are stopped (Step S10) to make the display of the sub video itself temporarily halting.

When the playback of the sub video is completed (S9; Yes), or when the playback time of the main video has passed the end time of the sub video displayable time (S3; Yes), the sub video display processing is ended.

FIGS. 7 to 10 are diagrams schematically showing the positional relationships between the main video and sub video. The vertical direction shows the spatial position in the main video and the horizontal direction shows time. Now, the main video starts to be output at time "00:00:00". The drawings also show the displayed status of the sub video when the metadata structure shown in FIG. 2(a) is used.

Figure 7:
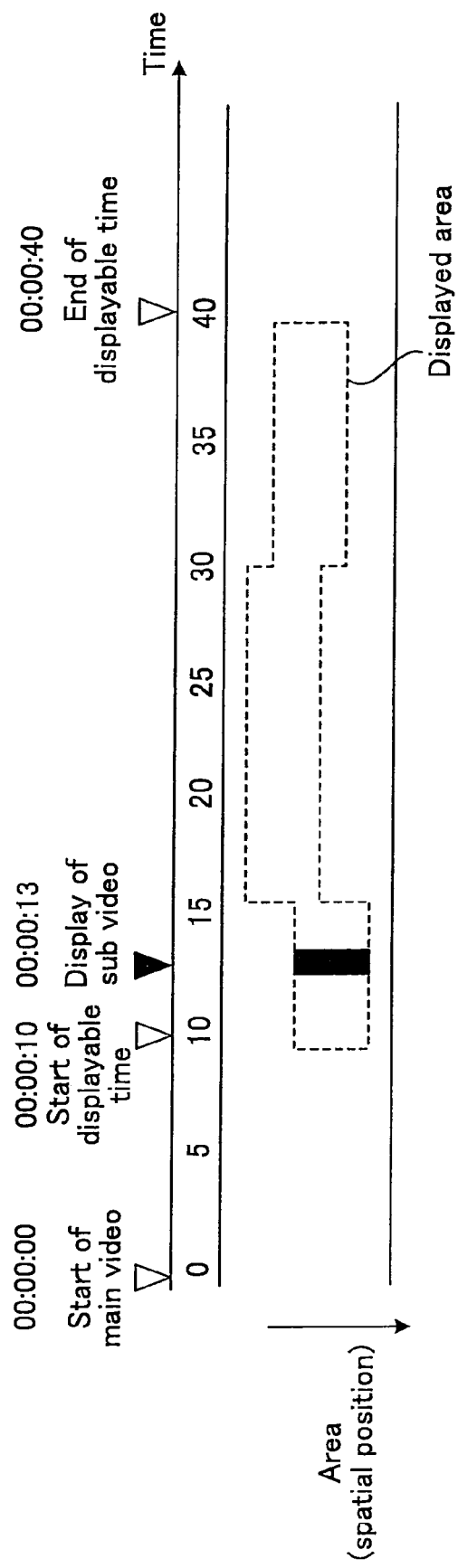
FIG. 7 is an illustrative diagram showing a first displaying state when a video is displayed on the video display apparatus according to the first embodiment of the present invention.

First, FIG. 7 is a diagram showing the situation up to time "00:00:13". Referring to the metadata structure in FIG. 2(a), the sub video-displayable time starts from time "00:00:10". Then, as a control for displaying the sub video is made by the user at time "00:00:13" (Step S2; Yes→Step S3; No→Step S4; Yes in FIG. 6), the sub video is decoded (Step S5). This sub video is synthesized with the main video, and display of the sub video at the displayed position corresponding to time "00:00:13", designated by the metadata is started (the black solid portion in FIG. 7).

Figure 8:
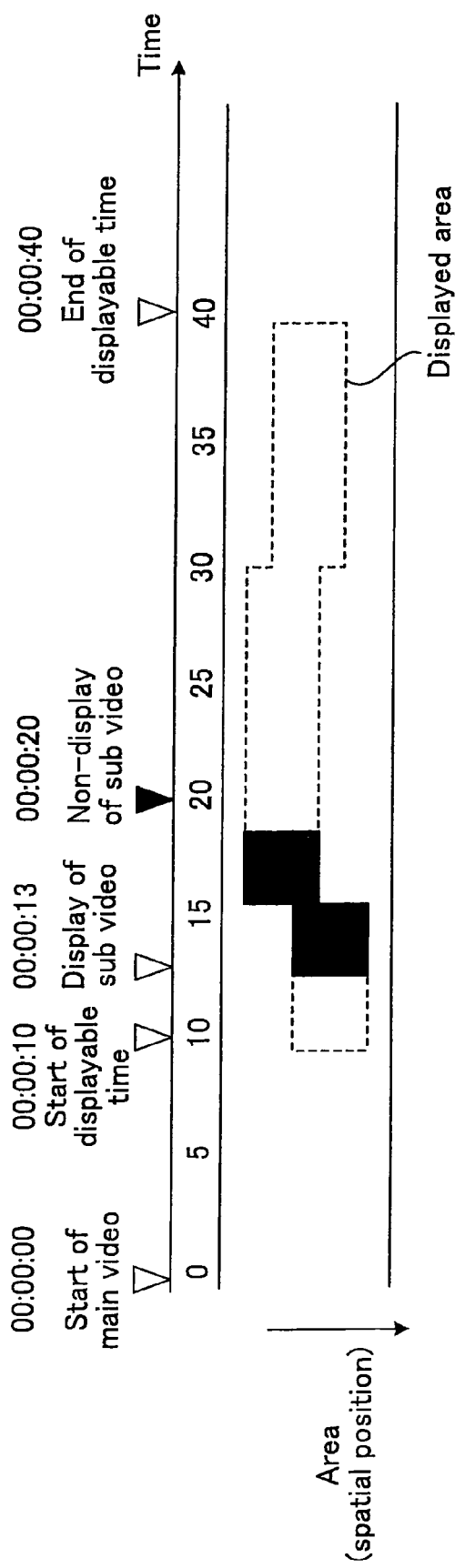
FIG. 8 is an illustrative diagram showing a second displaying state when a video is displayed on the video display apparatus according to the first embodiment of the present invention.

Secondly, FIG. 8 is a diagram showing the situation up to time "00:00:20". Referring to the metadata structure in FIG. 2(a), the process of changing the displayed area of the sub video at time "00:00:15" is described. Accordingly, position designator 110 changes the displayed position of the sub video in accordance with displayed area information 202 in the metadata (Step S7). Then, when a signal for setting the sub video status into the non-displayed state is input through input unit 108 at time "00:00:20" (Step S4; No), a signal for stopping the sub video output is output from position designator 110 to synthesizer 105. As a result, synthesizer 105 stops the sub video output (Step S10).

Figure 9:
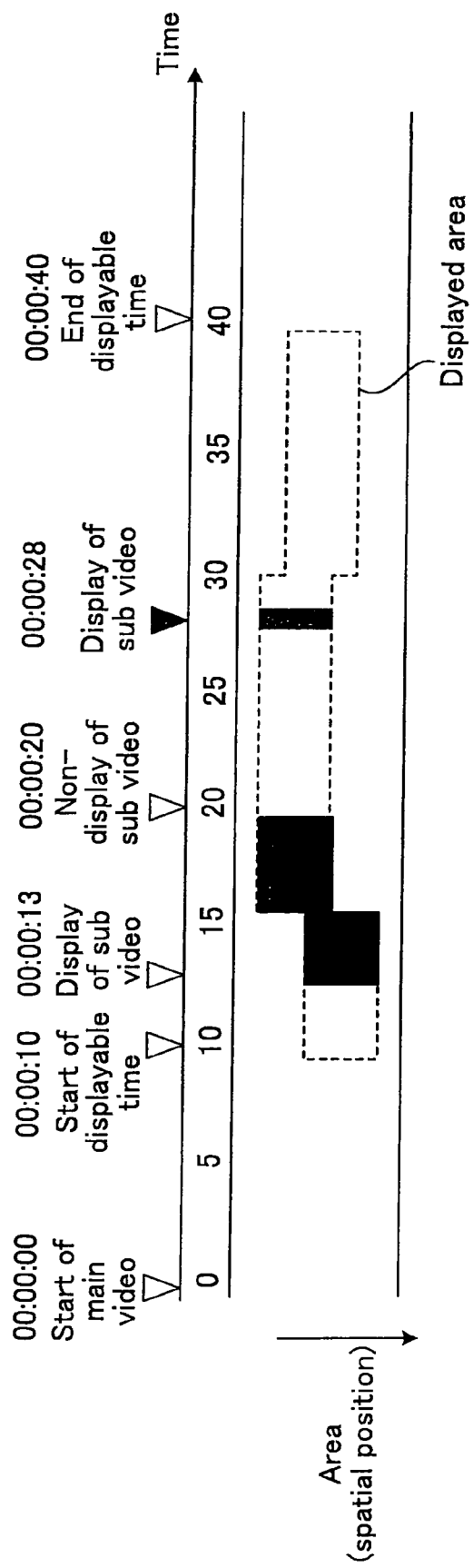
FIG. 9 is an illustrative diagram showing a third displaying state when a video is displayed on the video display apparatus according to the first embodiment of the present invention.

Next, FIG. 9 is a diagram showing the situation up to time "00:00:28", in which the display has been switched into the sub video (child frame)-displayed state once again. On this occasion, the sub video is returned to the playback state from the pausing state, and the continuation of the sub video that was played at time "00:00:20" is played. The sub video (child frame) at that time is displayed at a displayed position corresponding to time "00:00:28" designated by the metadata.

Figure 10:
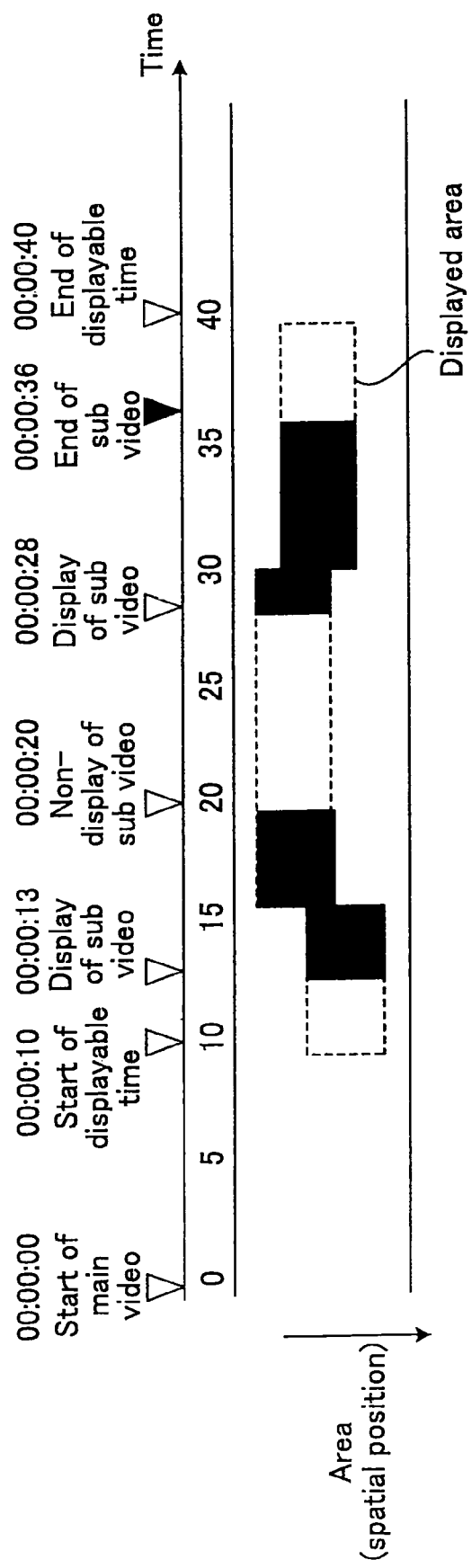
FIG. 10 is an illustrative diagram showing a fourth displaying state when a video is displayed on the video display apparatus according to the first embodiment of the present invention.

Next, FIG. 10 is a diagram showing the situation up to time "00:00:36", in which playback of the sub video having a total playback time of "15 seconds" has been completed. Referring first to the metadata described in FIG. 2(a), the displayed area of the sub video is changed at time "00:00:30" (Step S7). Then at time "00:00:36" at which the total playback time "15 seconds" has elapsed, the output of the sub video stops (Step S9; Yes).

As has been described heretofore, in video display apparatus 1 according to the first embodiment of the present invention, when a sub video is synthesized and displayed with the main video by use of the metadata that gives the sub video-displayed area or displayable area, the displayed position of the sub video inside the main video in correspondence to the display time can be appropriately designated. As a result, the sub video can be freely switched between the displayed and non-displayed states within the range of displayable time. Further, even if switching between the displayed and non-displayed states is freely done, it is possible to avoid the sub video, being synthesized and displayed at a position unfavorable to the main video.

In FIG. 1 of the present embodiment, the above-described metadata is illustrated so as to be input independently of each set of video data. For example, when management data for managing video data (information such as an encoding system and the like, required to decode encoded data and information required for playing the video such as a play list that specifies video clipping and joining) is given as a stream separate from video data, the metadata can be stored into the management data so as to be given to video display apparatus 1. Alternatively, as already illustrated in FIG. 2(a) or FIG. 3(a), the above-described metadata may be supplied by being stored in the video stream that includes the video data of sub video. In this case, it is necessary to provide a process of separating the metadata from the video stream of the sub video before the stream is input to video display apparatus 1.

Further, since the aforementioned metadata is consumed as the sub video is played back, it is generally considered that the metadata is given in one-to-one correspondence with sub video. However, for example, it is also possible to consider a using method such that the main video has a set of metadata, which is commonly applied to a plurality of sets of sub videos. In this case, the metadata may be stored in the video data (video data stream) of the main video. Further, though in FIGS. 2(a) and 3(a) the aforementioned metadata is stored in the header position of the video stream, the storage position is not limited to this. For example, when video data is transmitted by dividing it into a plurality of packets, the metadata may be embedded as a new packet between one video packet and the next, or stored into the packet header of each video packet.

The video distributor is able to display a sub video in picture-in-picture mode at a displayed position that is intended by the distributor by supplying metadata together with video data in the way described above.

Further, though synthesizer 105 of video display apparatus 1 shown in FIG. 1 adjusts the sub video only and makes no adjustment for the main video (that is, the main video is displayed in the full screen), it is possible to use a synthesizer 105a which also includes an adjuster 106a (as an additional adjuster separate from adjuster 106 for sub video) on the input side of the decoded video of the main video so as to produce an output by adjusting both the main and sub videos (synthesizer 105a and adjuster 106a are not particularly illustrated). In this case, however, since the metadata represents the displayed (displayable) area on the main video onto which the sub video is synthesized and displayed, when the main video is adjusted by the aforementioned adjuster 106a, it is necessary to adjust the sub video-displayed (displayable) area that is given by the metadata, in conformity with the above adjustment. Illustratively, for example, if the main video is reduced, for display, to half both vertically and horizontally, the sub video-displayed (displayable) area that is synthesized and displayed with the main video is also compressed by half vertically and horizontally. Though this reference will not be particularly mentioned in the other embodiments, this matter should be quite similarly applied to the other embodiments.

The Second Embodiment

Next, a video display apparatus, method and data for display according to the second embodiment of the present invention will be described using FIGS. 1, 6 and 11 through 15.

The schematic configuration of video display apparatus 2 according to the second embodiment of the present invention can be given by the functional block diagram of FIG. 1, similarly to the first embodiment. However, in the second embodiment, the metadata handled here is different from that of the first embodiment. As for the operation of the display apparatus, only the operation of the position designator is different between video display apparatus 1 (position designator 110) and video display apparatus 2 (position designator 210). So, hereinbelow, the metadata used in video display apparatus 2 of the second embodiment and the specific operation during playback using this metadata will be described mainly focusing on the difference from the first embodiment.

Figure 11:
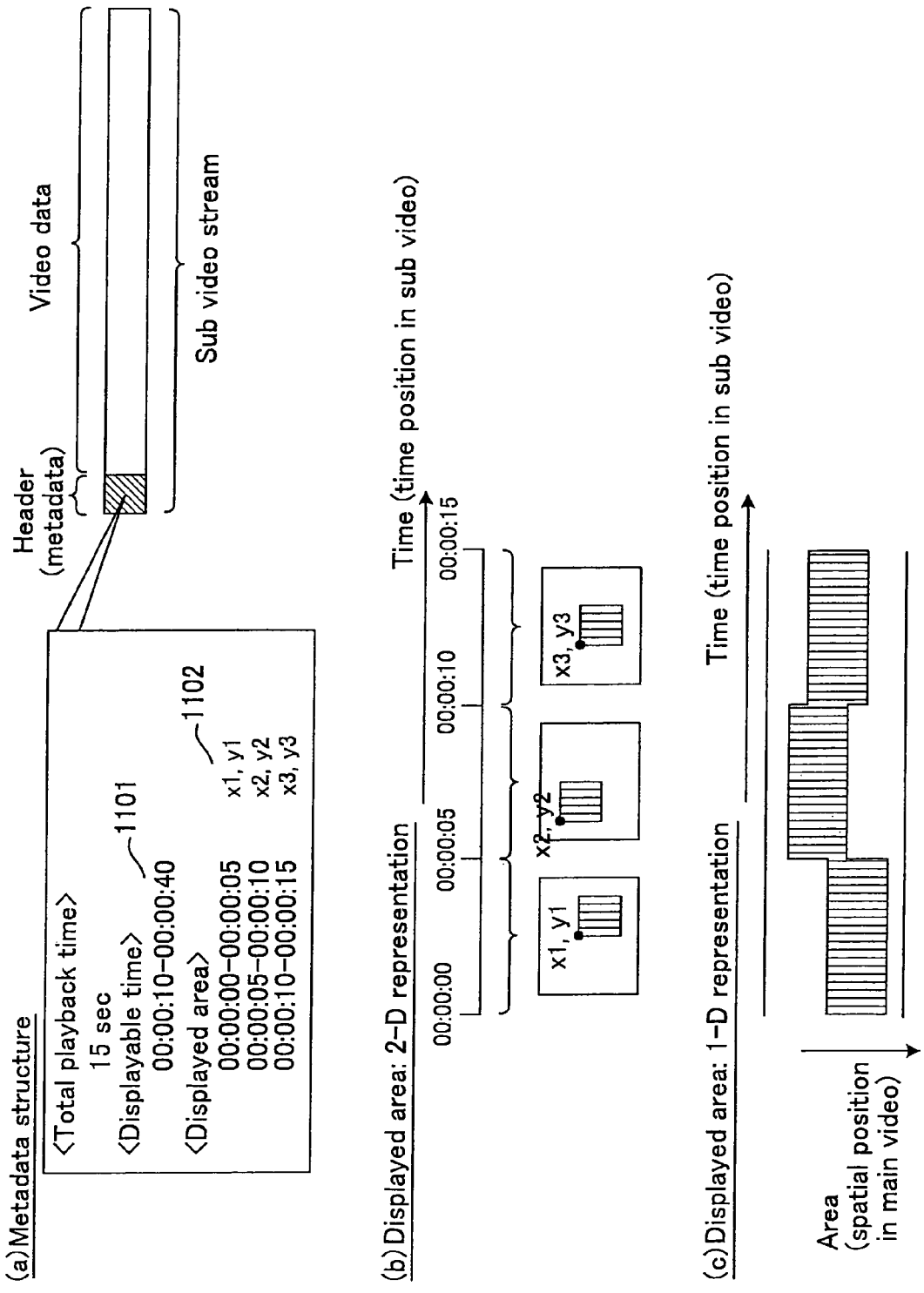
FIG. 11 is a diagram showing an example of data for display used in, the video display apparatus according to the second embodiment of the present invention.

FIG. 11 shows an example of metadata handled in the second embodiment. The metadata (FIGS. 2 and 3) exemplified in the first embodiment is to give a displayed area of a sub video (child frame) in the main video that is favorable to the main video when a sub video is displayed within the displayable time. Therefore, in the metadata shown in FIG. 2 and FIG. 3, the displayed area of the sub video is given so as to be in correspondence with each point of playback time of the main video based on the playback time axis with regard to the main video. In contrast, the metadata according to the second embodiment shown in FIG. 11 is to give a preferable displayed area in which, when a sub video is displayed, the sub-video itself can be displayed in a preferable manner depending on the content of the sub video and creative intention. Accordingly, in the metadata according to the second embodiment, the sub video-displayed area is given so as to be in correspondence with each point of playback time in the sub video based on the playback time axis with regard to the sub video.

Here, the preferable displayed position depending on the content of the sub video is applied to a usage case in which, when, for example a 10-second sub video is composed of a scene of a person A facing rightward in the first five seconds and another scene of a person B facing leftward in the remaining five seconds, a sub-video picture is displayed on the left-hand side on the screen in the first five seconds and a sub-video picture is displayed on the right-hand side on the screen in the remaining five seconds so that both the persons A and B face the center of the screen. Of course, this is a mere example, and it is not always desirable for both persons to face the center, but the positions where sub-video pictures are displayed depends on the directive intention of the video director. In sum, the metadata according to the second embodiment as shown in FIG. 11 is understood to be additional information for indicating the creative intention of the sub-video's director in the playback of the sub video itself.

Similarly to FIG. 2 for the first embodiment, FIG. 11(*a*) shows a specific metadata structure, FIG. 11(*b*) shows the displayed area designated by the metadata, and FIG. 11(*c*) schematically shows temporal change of the displayed area in a one-dimensional representation for easy understanding. As described above, the horizontal axes in FIGS. 11(*b*) and 11(*c*) represent the playback time position of the sub video. The vertical axis in FIG. 11(*c*) represent the spatial two-dimensional position on the screen and the vertical width of the illustrated band corresponds to the size of the displayed area.

The metadata shown in FIG. 11(*a*) is comprised of: displayable time information 1101 that represents the time range of the main video that allows the sub video to be displayed; and displayed area information 1102 that shows the position in the main video in which the sub video should be displayed at each playback time point of the sub video, based on the sub video's playback time axis. However, displayable time information 1101 is not essential and can be omitted. If omitted, the whole part of the main video is understood as the displayable time of the sub video.

In FIG. 11, the case in which the displayed area is specified simply with the coordinates of the upper left vertex of the child frame (or center of the child frame) was described as an example of displayed area information 1102 on the assumption that the display size of the sub video (child frame) has a predetermined fixed size. However, the displayed area information is not limited to this. Similarly to the first embodiment, two sets of coordinates may be given to designate a displayable area (see FIG. 3) or two sets of coordinates may be given to designate a displayed area in which the sub video is displayed with enlargement or reduction. In FIG. 11(*c*), the displayed area in which the sub video should be displayed is represented as a band-like area that changes its position at the sub video-playback time "00:00:05" (i.e., in total, five seconds after the start of playback of the sub video) and at "00:00:10" (i.e., in total, ten seconds after the start of playback of the sub video).

Referring next to FIGS. 6, 12 to 15, description will be made of a specific operation when the sub video is synthesized with the main video, played back and displayed using the metadata shown in FIG. 11.

Similarly to the first embodiment, the process when video display apparatus 2 according to the present embodiment performs sub video display including the switching of display/non-display of the sub video (child frame) is shown by the flow chart in FIG. 6. This flow chart shows the operations of position designator 210, processing controller 109 and synthesizer 105 of the apparatus components of video display apparatus 2 shown in FIG. 1.

Similarly to the description in the first embodiment, in the description hereinbelow, playback and display processing using metadata that gives displayed area will be described. However, even though use is made of metadata that describes displayable area, the basic operation is unchanged except in that an appropriate displayed position is selected from the displayable area by position designator 210 to be output.

Position designator 210 reads input metadata (Step S1), and then based on displayable time information 1101 included in the metadata, determines whether the current playback time in the main video falls within the displayable time (Steps S2 and S3). If the current playback time is before the starting time of the displayable time, no sub video is displayed and the start of the displayable time is waited for (Step S2; No).

If the current playback time in the main video is within the displayable time (Step S2; Yes→Step S3; No), position designator 210 takes up a switching instruction between sub video displayed and non-displayed statuses from input unit 108. Here, when the instruction for displaying a sub video is received and the sub video is in the displayed status (Step S4; Yes), a decoding process of the sub video is implemented so as to output a decoded picture (Step S5). Further, position designator 210 acquires the time information regarding the current playback time position in the sub video (Step S6) and determines the displayed position corresponding to the current playback time position in the sub video, based on the metadata (Step S7). Then, synthesizer 105 synthesizes and displays the sub video in the displayed position designated in the main video (Step S8). In the above way, there are two different points from the first embodiment: at Step S6 the total playback time position of the sub video itself is acquired as the time information; and at Step S7 the displayed position corresponding to the playback time position of the sub video is determined using the metadata.

FIGS. 12 to 15 are diagrams schematically showing an example of the operational result when a sub video is synthesized and displayed on video display apparatus 2. Here, in video display apparatus 2 of this embodiment, the metadata is controlled based on the sub video-playback time that represents the position at which the sub video has been reproduced and displayed, separately from the playback time of the main video, so each of FIGS. 12 to 15, (a) shows how the displayed area is designated by the metadata based on the sub video-playback time and (b) shows how the sub video is synthesized and displayed with the main video based on the main video-playback time. In the drawings (b) of FIGS. 12 to 15, the solid black portion indicates a period during which the sub video is displayed and the displayed position at that time.

Figure 12:
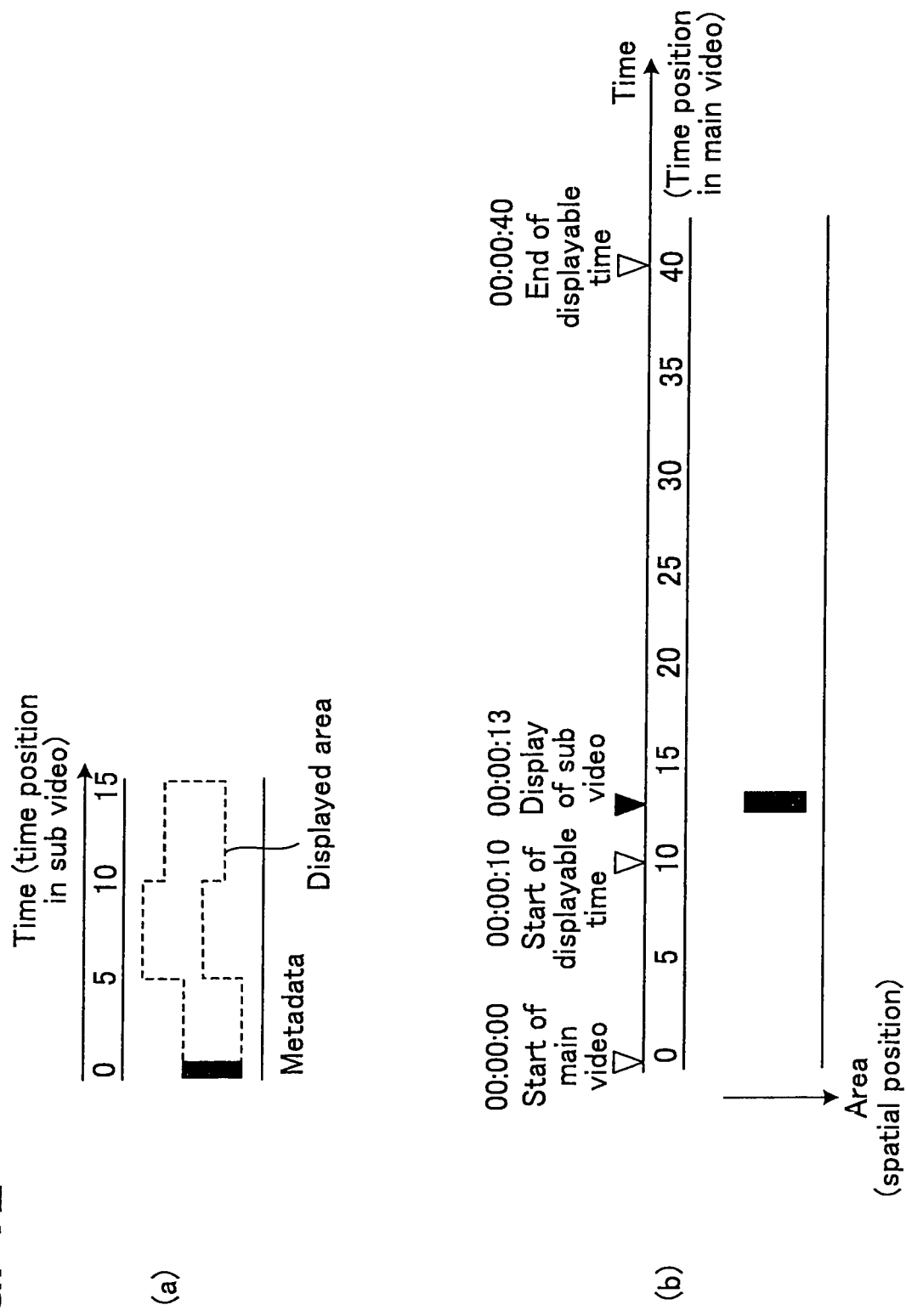
FIG. 12 is an illustrative diagram showing a first displaying state when a video is displayed on the video display apparatus according to the second embodiment of the present invention.

First, FIG. 12 is a diagram showing the situation up to time "00:00:13". Referring to the metadata structure in FIG. 11(a), the sub video-displayable time starts from time "00:00:10". Then, as a control for displaying the sub video is made by the user at time "00:00:13" (Step S2; Yes→Step S3; No→Step S4; Yes in FIG. 6), the sub video is decoded (Step S5). This sub video is synthesized with the main video, and display of the sub video at the displayed position corresponding to time "00:00:13", designated by the metadata is started. Here, FIG. 12(a) shows the state when the video starts to be output from "00:00:00" in the sub video-playback time. FIG. 12(b) shows the state when the sub video starts to be output when the main video-playback time is "00:00:13".

Figure 13:
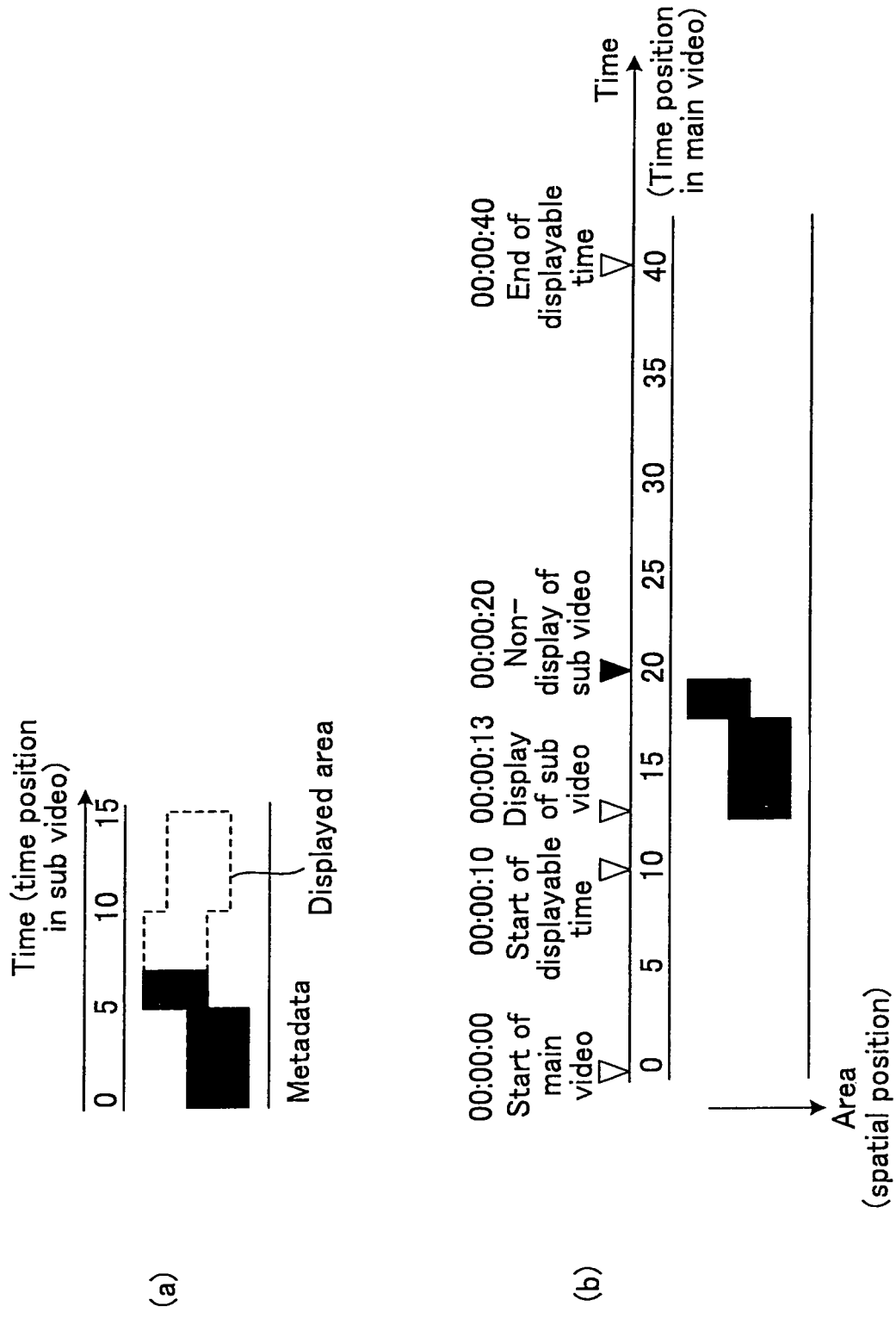
FIG. 13 is an illustrative diagram showing a second displaying state when a video is displayed on the video display apparatus according to the second embodiment of the present invention.

Secondly, FIG. 13 is a diagram showing the situation up to time "00:00:20". Referring to displayed area information 1102 of the metadata structure in FIG. 11(a), the displayed area of the sub video is changed at "00:00:05" in the sub video-playback time. Accordingly, as shown in FIG. 13(a) the displayed area changes at "00:00:05" in the sub video-playback time. As a result, on the synthesized video, the displayed position is changed at time "00:0018", which corresponds to a point of time five seconds after the playback (display) of the sub video started, as shown in FIG. 13(b). Then, when the sub video is set into the non-displayed state at "00:00:20" in the main video-playback time, the display of the sub video in the main video stops. At this condition, the sub video has been played up to "00:00:07".

Figure 14:
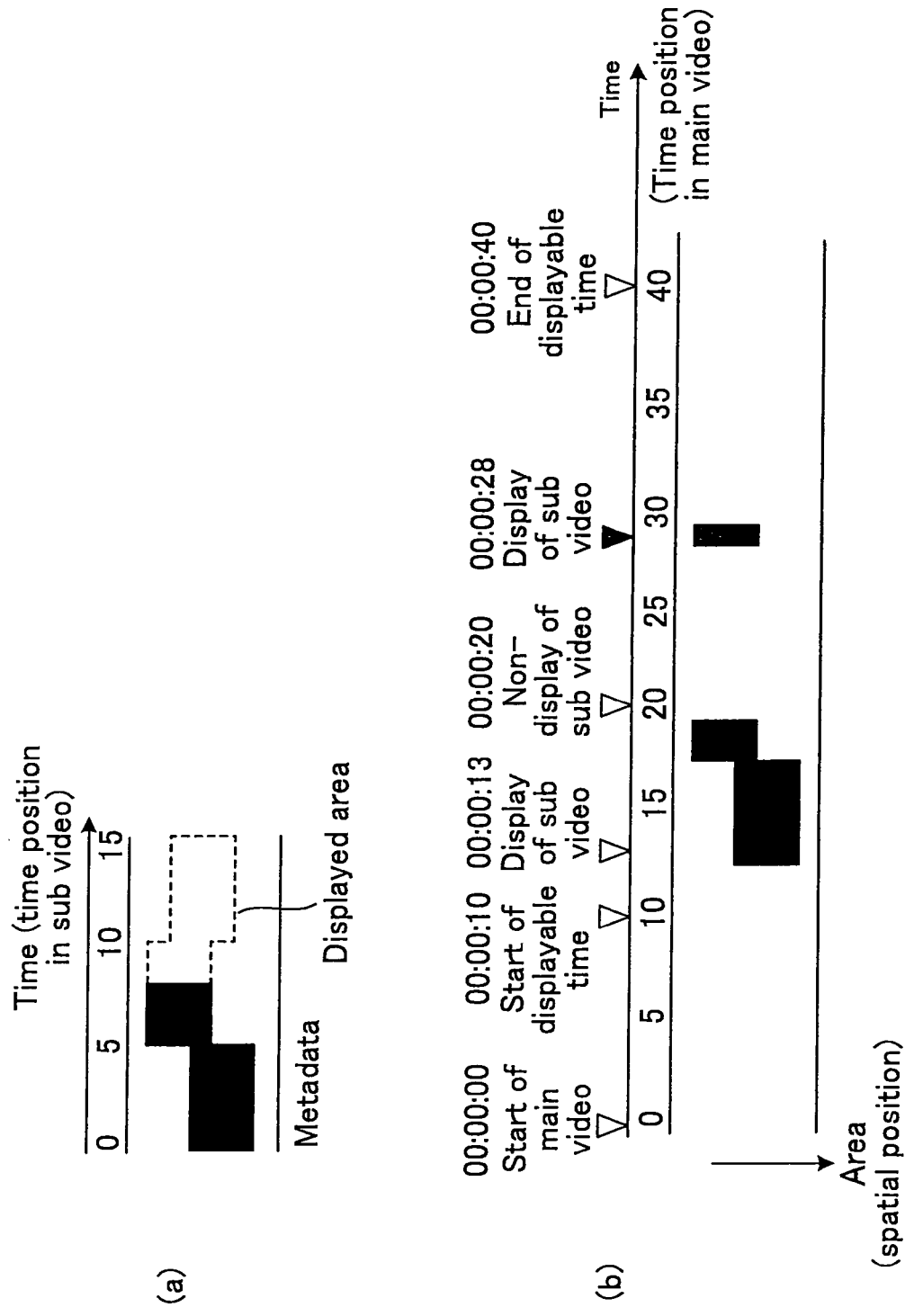
FIG. 14 is an illustrative diagram showing a third displaying state when a video is displayed on the video display apparatus according to the second embodiment of the present invention.

Next, FIG. 14 is a diagram showing the situation up to time "00:00:28", in which the display has been switched into the sub video (child frame)-displayed state once again. On this occasion, the sub video is returned to the playback state from the pausing state, and the continuation of the sub video that was played at "00:00:20" in the main video time, in other words, the sub video is started to be played from the time position "00:00:07" in the sub video time (the time position corresponding to the total playback time of 7 seconds). The displayed position of the sub video (child frame) is given by the metadata so that the sub video is displayed at a displayed position corresponding to "00:00:07" in the sub video time position (the time position corresponding to the total playback time of 7 seconds).

Figure 15:
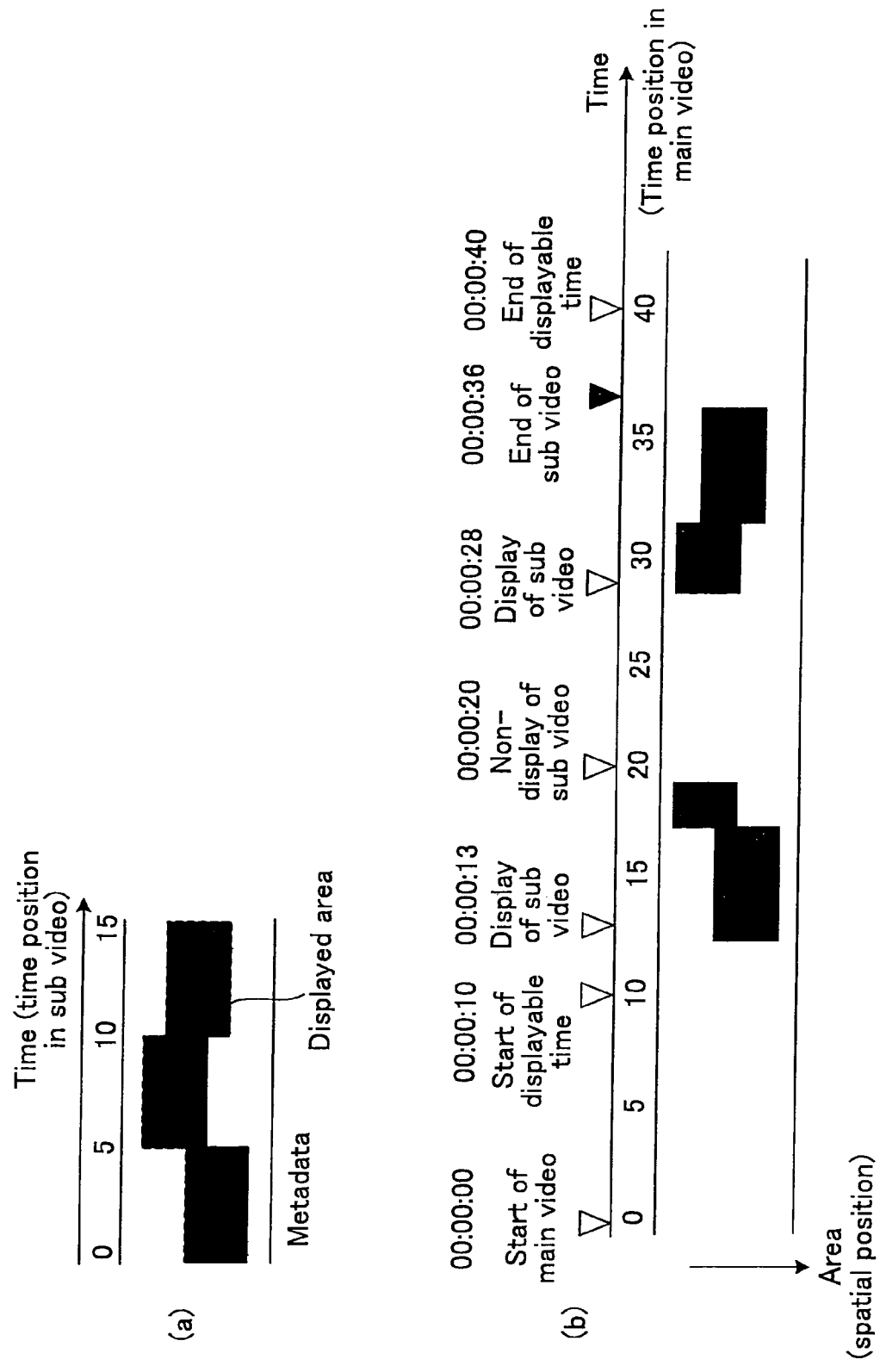
FIG. 15 is an illustrative diagram showing a fourth displaying state when a video is displayed on the video display apparatus according to the second embodiment of the present invention.

Next, FIG. 15 is a diagram showing the situation up to "00:00:36" in the main video time, in which playback of the sub video having a total playback time of "15 seconds" has been completed. Referring to displayed area information 1102 included in the metadata described in FIG. 11(a), the displayed position of the sub video is changed at "00:00:10" in the sub video time (at time position corresponding to the total playback time of 10 seconds). Accordingly, at "00:00:10" in the sub video time, or at "00:00:31" in the main video time, the displayed position of the sub video is changed.

As has been described heretofore, in video display apparatus 2 according to the present embodiment, when a sub video is synthesized and displayed with the main video by use of the metadata that gives the sub video-displayed area (or displayable area), it is possible to synthesize and display the sub video with the main video by specifying the position where the sub video should be displayed, which is previously determined depending on the content of the sub video and/or creative intention. As a result, the sub video can be freely switched between the displayed and non-displayed states. Also, if switching between the displayed and non-displayed states is freely done, it is possible to synthesize and display the sub video in the displayed position in conformity with the content of the sub video and/or creative intention.

Also with regard to the metadata of the present embodiment, the metadata can be supplied in a form, either by storing it similarly to the first embodiment, in, for example the data stream of management data that is independent of the video data, or by storing it in the video stream including the video data of the sub video as shown in FIG. 11(a). When stored in the video stream, it is necessary to provide a process of separating the metadata from the video stream of the sub video before its input to video display apparatus 2. It should be noted that since the metadata according to the second embodiment is given in one-to-one correspondence with sub video, the metadata is normally added to the video data of the sub video or to the management data regarding to the sub video. Further, though in FIG. 11(a) the metadata is stored in the header position of the video stream, the storage position is not limited to this. For example, when video data is transmitted by dividing it into a plurality of packets, the metadata may be embedded as a new packet between one video packet and the next, or stored into the packet header of each video packet.

The Third Embodiment

Next, a video display apparatus, method and data for display according to the third embodiment of the present invention will be described using FIGS. 1, 6 and 16.

The schematic configuration of a video display apparatus 3 according to the third embodiment of the present invention can be given by the functional block diagram of FIG. 1, similarly to the first and second embodiments. However, since the operation of position designator 110 alone is different, in the present embodiment the position designator is designated at 310. The process of performing sub video display on the video display apparatus 3 according to the third embodiment is also given by the flow chart shown in FIG. 6, similarly to the first and second embodiments. Hereinbelow, the operation of video display apparatus 3 according to the third embodiment will be described focusing on the difference from the video display apparatus 1 of the first embodiment.

In video display apparatus 3 in the present embodiment, two kinds of metadata described in the first and second embodiments are input as the metadata for displaying a sub video, so that the displayed area of the sub video is determined based on the combination of these two sets of metadata. Accordingly, position designator 310 of video display apparatus 3 receives two kinds of metadata and two sets of time information (main video's playback time positional information and sub video's playback time positional information) (Step S6 in the flow chart) and determines an appropriate display area for the sub video (Step S7 in the flow chart).

Figure 16:
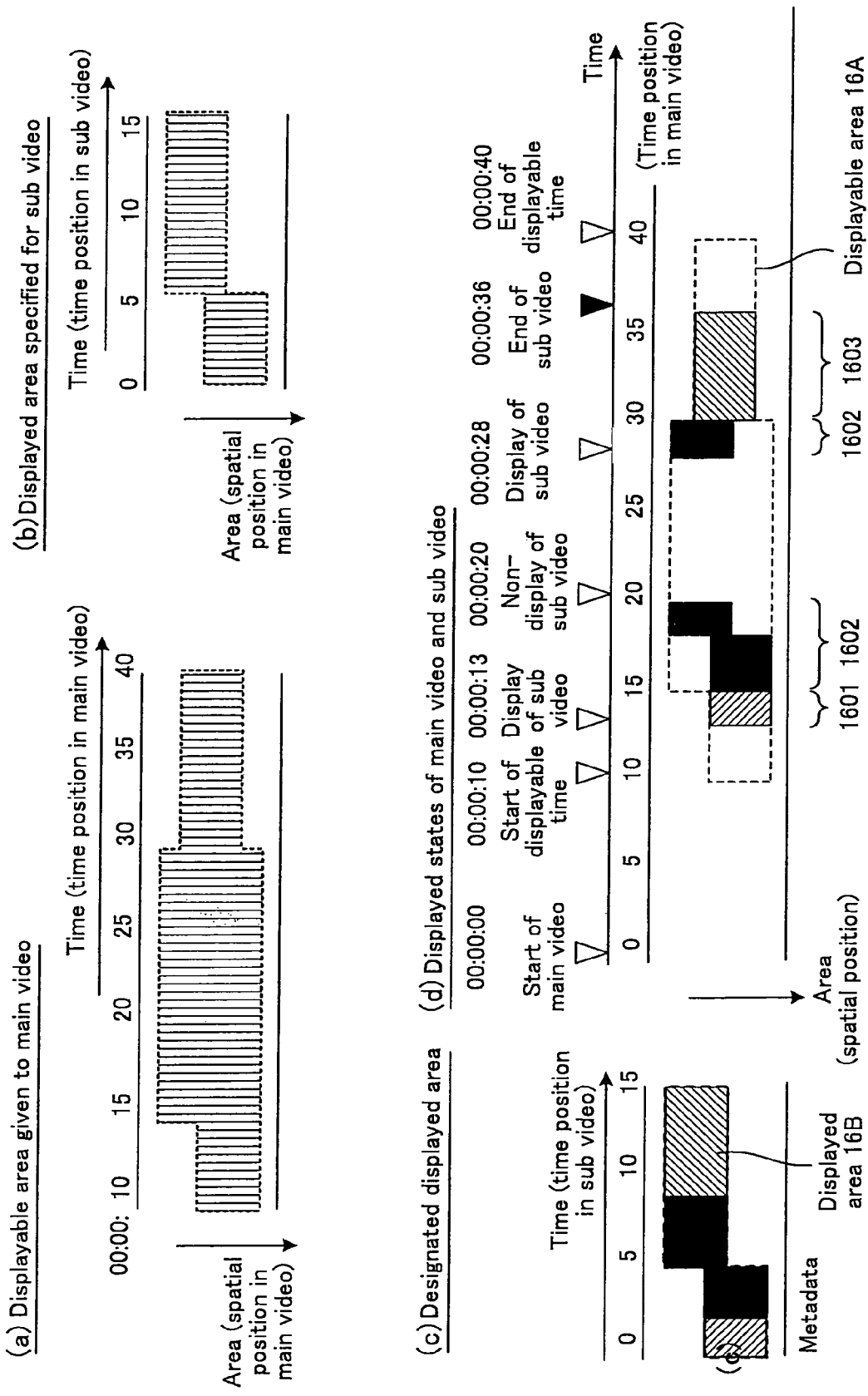
FIG. 16 is a diagram showing a process when a video is displayed on the video display apparatus according to the third embodiment of the present invention.
Figure 17:
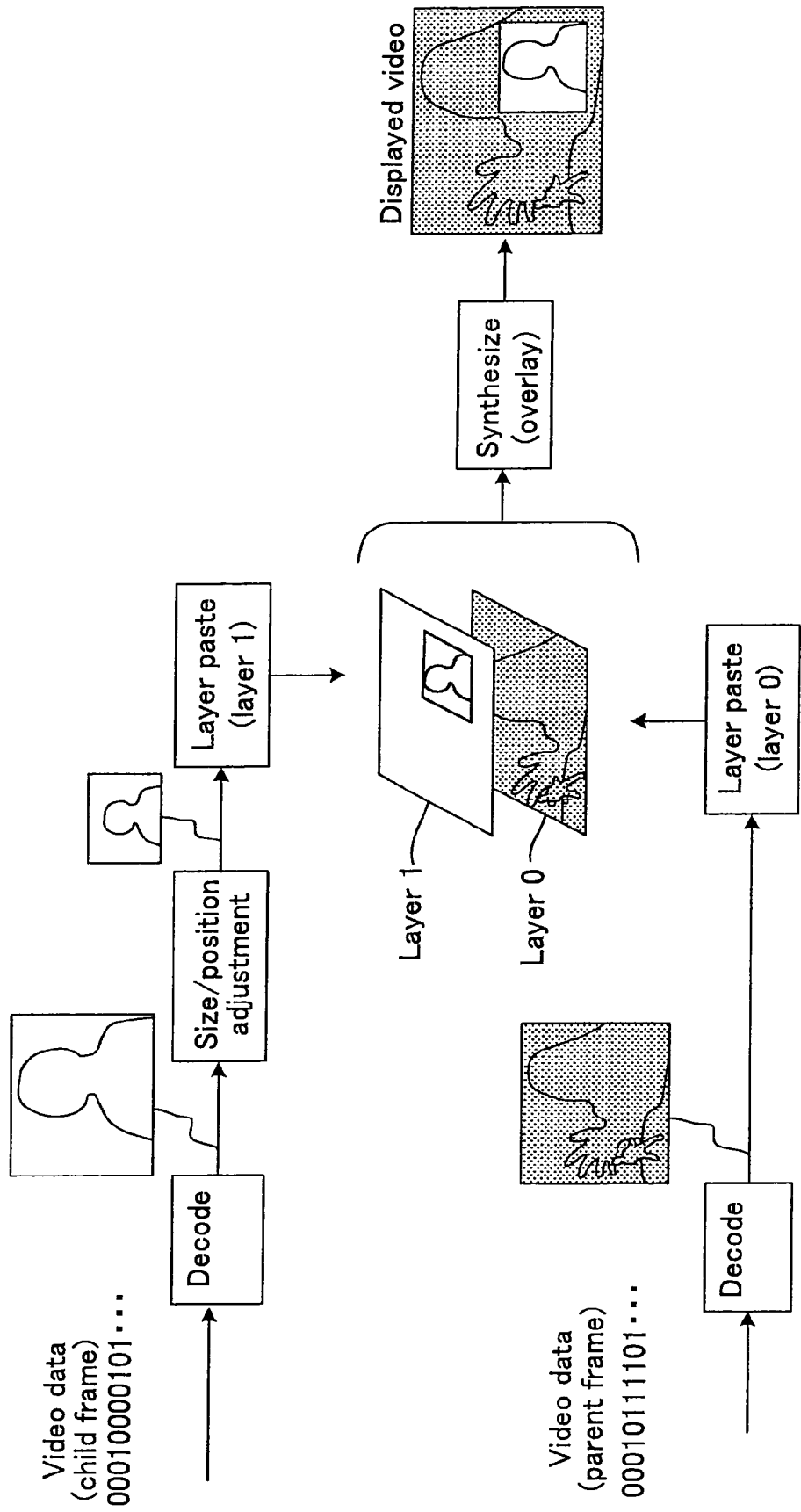
FIG. 17 is an illustrative diagram showing a method of realizing a conventional picture-in-picture function.

FIG. 16 is a diagram schematically showing the states of main and sub videos. FIG. 16(a) shows the sub video-displayable area designated in relation to the main video, given by the metadata described in the first embodiment while FIG. 16(b)

shows the displayed area designated in relation to the sub video itself, given by the metadata described in the second embodiment. FIG. 16(c) is a diagram showing how the displayed area of the sub video during playback is designated by the metadata of FIG. 16(b). FIG. 16(d) is a diagram showing a situation in which the main video and sub video are synthesized and displayed by the metadata of FIGS. 16(a) and 16(b).

FIGS. 16(c) and 16(d), similarly to the first and second embodiments, show the displayed position of a sub video using the aforementioned two kinds of metadata when the sub video is started to display at time "00:00:13", stopped to display at time "00:00:20", restarted to display at time "00:00:28" and ended to display at time "00:00:36". Further, in FIG. 16(c) a displayed area 16B corresponding to the sub video shown in (b) is given and in FIG. 16(d) a displayable area 16A of the sub video in the main video shown in (a) is shown. The hatched areas or black solid areas in FIG. 16(d) show the periods in which the sub video is displayed and the displayed positions in those periods.

It is usual that a sub video is given to the main video as a value-added extra content. Therefore, it is generally desirable that its playback is performed while the main video is kept from destruction as far as possible. Accordingly, when the aforementioned two kinds of metadata are given, the displayed area is determined by giving priority to the sub video-displayable area 16A that is given in relation to the main video over the displayed area 16B that is given in relation to the sub video itself.

In FIG. 16(d), in a time range 1601 ("00:00:13" to "00:00:15"), displayable area 16A and displayed area 16B exactly overlap each other, so that the displayed area of the sub video is determined based on both sets of metadata.

In a time range 1602 ("00:00:15" to "00:00:20" and "00:00:28" to "00:00:30") displayed area 16B is completely included in displayable area 16A. Accordingly, in range 1602 the sub video is displayed in the displayed area that is given to the sub video itself based on the metadata similar to that shown in the second embodiment.

In a time range 1603 ("00:00:30" to "00:00:36"), sub video-displayable area 16A given to the main video and sub video-displayed area 16B designated in conformity with the sub video content itself are separated in different regions. In this case, sub video-displayable area 16A that is given to the main video is given priority. That is, in time range 1603, the sub video is displayed in the sub video-displayable area that is given to the main video based on the metadata similar to that shown in the first embodiment.

Though not illustrated, when the displayable area shown in FIG. 16(a) and the displayed area shown in FIG. 16(b) to specify the displayed position of the sub video are located in different areas and when the displayable area shown in FIG. 16(a) is greater than the display size of the sub video (child frame), a process of setting up a sub video-displayed area by determining an area that is included in the displayable area of FIG. 16(a) and becomes closest to the displayed area of FIG. 16(b) may be added. Of course, if, conversely, the creative intention of the sub video is markedly important, it is possible to set the displayed position of the sub video by force based on the displayed area of FIG. 16(b) by giving the displayed area of FIG. 16(b) a high priority.

Here, in each of the above-described embodiments of the present invention, the video data (and management data) and metadata input to the video display apparatus either may be supplied through transmission paths such as broadcasting and/or communication, or may have been recorded beforehand on a recording medium so that the video data (and management data) and metadata recorded on the recording medium is sequentially read out to play it back for display. The situation is the same for the case in which the data is recorded once on a recording medium through a transmission path and then the recorded video data (and management data) with the metadata is read out for its playback. That is, the video display apparatus, method and data for display of the present invention can be applied as one component of a broadcast video receiver, video communication receiver and recording and reproducing apparatus having a recording medium and also can be applied to a recording medium on which the metadata described in each embodiment has been recorded.

It is also possible to control the metadata shown in each embodiment of the present invention separately from the video data (and management). From this feature, when metadata is generated on the reproduction side, it is also possible to use the generated metadata on the reproduction side in combination with the video data that is separately input through broadcasting, communication or a recording medium when the video is played back in picture in picture. In this case, for example, the metadata can be formed with such processing as user preference settings for the areas which the user does not care to be hidden and which are not wanted to be hidden in the main video during displaying a sub video. The generation of the metadata on the reproduction side is carried out when the video data (and management data) input through a transmission path such as broadcasting, communication etc., is recorded in the recording medium or directly before the video data (and management data) is played back after reading them out from the recording medium. This generating process may be done by user's direct input or may be done dynamically using a program such as Java (registered trademark) or the like. That is, the present invention can be applied to a video display apparatus and method that uses the metadata described in each embodiment no matter where the metadata was finally set up.

Here, the embodiments disclosed herein are, in all respects, illustrative and not restrictive. The scope of the present invention is defined by the scope of claims rather than the foregoing description, and all changes that fall within the meaning and scope equivalent to the scope of claims are intended to be embraced by the claims.

The invention claimed is:

1. A non-transitory recording medium recording a first video, a second video, and metadata for displaying the first video and the second video by laying and synthesizing the second video over the first video,
wherein
a displayable period of the second video is designated within a playback time of the first video, wherein: i) the displayable period represents a time range of the first video during which the second video is allowed to be displayed, ii) the displayable period is longer than a total playback time of the second video, iii) a playback speed of the second video is not altered independently of a playback speed of the first video during playback of the second video within the displayable period that is longer than the total playback time of the second video, and iv) the displayable period is not the entire first video;
a playback of the second video is started at an arbitrary point of time within the displayable period; is ended when the second video is completed or a playback time of the second video is past the displayable period; and is switchable between display and non-display at an arbitrary point of time during playing, and the metadata is data designated in a range of all time within a displayable period, and includes:
  time information representing time in the first video within the displayable period; and
  displayed area information representing a displayed position when the second video is displayed at the time in the first video, wherein the displayed position is a position over the first video that the second video is displayed at the time in the first video, wherein the displayed position changes to a different position within the displayable period,
data on the non-transitory recording medium is reproduced by a video synthesizing apparatus which reads out the first video, the second video and the metadata wherein the metadata manages the time at which a displayed area of the second video is changed to the different position in the first video, and lays and synthesizes the second video over the displayed position inside the first video based on the metadata when the second video is displayed at an arbitrary point of time.

2. The non-transitory recording medium according to claim 1, wherein the displayed area information includes information that indicates a set of coordinates or a size of the displayed area for displaying the second video.

3. A non-transitory recording medium recording a first video, a second video, and metadata for displaying the first video and the second video by laying and synthesizing the second video over the first video,
  wherein
    a displayable period of the second video is designated within a playback time of the first video, wherein: i) the displayable period represents a time range of the first video during which the second video is allowed to be displayed, ii) the displayable period is longer than a total playback time of the second video, iii) a playback speed of the second video is not altered independently of a playback speed of the first video during playback of the second video within the displayable period that is longer than the total playback time of the second video, and iv) the displayable period is not the entire first video;
    a playback of the second video is started at an arbitrary point of time within the displayable period; is ended when the second video is completed or a playback time of the second video is past the displayable period; and is switchable between display and non-display at an arbitrary point of time during playing, and
  the metadata is data designated in a range of all time within a displayable period, and includes:
    time information representing time in the first video within the displayable period; and
    displayable area information representing a displayable position when the second video is displayed at the time in the first video, wherein the displayable position is a position over the first video that the second video is displayable at the time in the first video, wherein the displayable position changes to a different position within the displayable period,
  data on the non-transitory recording medium is reproduced by a video synthesizing apparatus which reads out the first video, the second video and the metadata, wherein the metadata manages the time at which a displayable area of the second video is changed to a different position in the first video, and lays and synthesizes the second video over the displayed position inside the first video based on the metadata when the second video is displayed at an arbitrary point of time.

4. The non-transitory recording medium according to claim 3, wherein the displayable area information includes information that indicates a set of coordinates or a size of the displayable area for the second video.

5. A data generating apparatus which generates metadata for displaying a first video and a second video by laying and synthesizing the second video over the first video,
  wherein
    a displayable period of the second video is designated within a playback time of the first video, wherein: i) the displayable period represents a time range of the first video during which the second video is allowed to be displayed, ii) the displayable period is longer than a total playback time of the second video, iii) a playback speed of the second video is not altered independently of a playback speed of the first video during playback of the second video within the displayable period that is longer than the total playback time of the second video, and iv) the displayable period is not the entire first video; and
    a playback of the second video is started at an arbitrary point of time within the displayable period; is ended when the second video is completed or a playback time of the second video is past the displayable period; and is switchable between display and non-display at an arbitrary point of time during playing, and
  the data generating apparatus includes:
    a designating means for designating time information representing time in the first video within the displayable period;
    a designating means for designating displayed area information representing a displayed position when the second video is displayed at the time in the first video, wherein the displayed position is a position over the first video that the second video is displayed at the time in the first video, wherein the displayed position changes to a different position within the displayable period, and
    a generating means for generating the metadata including the time information and the displayed area information, wherein the metadata manages the time at which a displayed area of the second video is changed to a different position in the first video, wherein the metadata is data designated in a range of all time within the displayable period,
    wherein data of the first video, data of the second video, and the metadata have been recorded on a single non-transitory recording medium in advance.

6. The data generating apparatus according to claim 5, wherein the displayed area information includes information that indicates a set of coordinates or a size of the displayed area for displaying the second video.

7. A data generating apparatus which generates metadata for displaying a first video and a second video by laying and synthesizing the second video over the first video,
  wherein
    a displayable period of the second video is designated within a playback time of the first video, wherein: i) the displayable period represents a time range of the first video during which the second video is allowed to be displayed, ii) the displayable period is longer than a total playback time of the second video, iii) a playback speed of the second video is not altered independently of a playback speed of the first video during playback of the second video within the displayable period that is longer than the total playback time of the second video, and iv) the displayable period is not the entire first video; and a playback of the second video is started at an arbitrary point of time within the displayable period; is ended when the second video is completed or a playback time of the second video is past the displayable period; and is switchable between display and non-display at an arbitrary point of time during playing, and the data generating apparatus includes:
- a designating means for designating time information representing time in the first video, in a range of all time within the displayable period;
- a designating means for designating displayable area information representing a displayable position when the second video is displayed at the time in the first video, wherein the displayable position is a position over the first video that the second video is displayable at the time in the first video, wherein the displayable position changes to a different position within the displayable period, and
- a generating means for generating the metadata including the time information and the displayable area information, wherein the metadata manages the time at which a displayable area of the second video is changed to a different position in the first video,
- wherein data of the first video, data of the second video, and the metadata have been recorded on a single non-transitory recording medium in advance.

8. The data generating apparatus according to claim 7, wherein the displayable area information includes information that indicates a set of coordinates or a size of the displayable area for displaying the second video.

* * * * *